US011874885B2

(12) United States Patent
Jeong et al.

(10) Patent No.: US 11,874,885 B2
(45) Date of Patent: Jan. 16, 2024

(54) METHOD AND APPARATUS FOR PROVIDING CONTENT BASED ON KNOWLEDGE GRAPH

(71) Applicant: SAMSUNG ELECTRONICS CO., LTD., Suwon-si (KR)

(72) Inventors: Mirae Jeong, Suwon-si (KR); Hyonsok Lee, Suwon-si (KR); Jungho Park, Suwon-si (KR); Jaehun Lee, Suwon-si (KR); Taeho Hwang, Suwon-si (KR); Yunsu Lee, Suwon-si (KR); Jiyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 16/928,644

(22) Filed: Jul. 14, 2020

(65) Prior Publication Data

US 2021/0089598 A1    Mar. 25, 2021

(30) Foreign Application Priority Data

Sep. 19, 2019  (KR) .................... 10-2019-0115474

(51) Int. Cl.
*G06F 16/9535* (2019.01)
*G06F 16/901* (2019.01)
*G06N 5/022* (2023.01)

(52) U.S. Cl.
CPC ...... *G06F 16/9535* (2019.01); *G06F 16/9024* (2019.01); *G06N 5/022* (2013.01)

(58) Field of Classification Search
None
See application file for complete search history.

(56) References Cited

U.S. PATENT DOCUMENTS 8,407,253 B2   3/2013  Ryu et al.
2006/0223495 A1  10/2006  Cassett et al.
(Continued)

FOREIGN PATENT DOCUMENTS

CA    2 823 406 A1   7/2012
JP    6150755 B2   6/2017
(Continued)

OTHER PUBLICATIONS

Communication dated Sep. 28, 2020 issued by the International Searching Authority in counterpart Application No. PCT/KR2020/008994 (PCT/ISA/220, PCT/ISA/210, and PCT/ISA/237).
(Continued)

*Primary Examiner* — Irene Baker
(74) *Attorney, Agent, or Firm* — Sughrue Mion, PLLC

(57) ABSTRACT

A content recommendation is provided based on a knowledge graph using, for example, a processor and memory of a device. In some embodiments, sensors are used. The content recommendation efficiently makes user of the processor, memory and/or sensors. A knowledge graph is maintained at the device and another knowledge graph may be maintained at a server. The knowledge graph at the device is generated, for example, by obtaining log history information, generating a device knowledge graph, generating a pattern knowledge graph associated with a behavior pattern of a user, and/or updating the device knowledge graph by adding the pattern knowledge graph to the device knowledge graph. In some examples, the knowledge graph at the server is generated by a server, based on the pattern knowledge graph.

16 Claims, 21 Drawing Sheets

(56) References Cited

U.S. PATENT DOCUMENTS

| | | | |
|---|---|---|---|
| 2006/0235823 A1* | 10/2006 | Chong | G06F 16/2455 |
| 2012/0041974 A1* | 2/2012 | Base | G06F 16/2448 |
| | | | 707/769 |
| 2012/0158633 A1 | 6/2012 | Eder | |
| 2013/0218687 A1* | 8/2013 | Sohangir | G06F 16/9535 |
| | | | 705/14.66 |
| 2014/0025660 A1* | 1/2014 | Mohammed | G06Q 50/265 |
| | | | 707/722 |
| 2017/0220663 A1* | 8/2017 | Zhao | G06F 11/30 |
| 2018/0004751 A1* | 1/2018 | Vikhe | G06F 16/248 |
| 2018/0048661 A1* | 2/2018 | Bird | G06F 21/57 |
| 2019/0286721 A1* | 9/2019 | Sharma | G06F 16/24 |

FOREIGN PATENT DOCUMENTS

| | | |
|---|---|---|
| KR | 100949620 B1 | 3/2010 |
| KR | 10-1306667 B1 | 9/2013 |
| KR | 10-2018-0096341 A | 8/2018 |

OTHER PUBLICATIONS

Communication dated Jul. 26, 2022, issued by the European Patent Office in counterpart European Application No. 20866196.7.

Yan et al., "Differentiated Fashion Recommendation Using Knowledge Graph and Data Augmentation," IEEE Access, vol. 7, pp. 102239-102248, Aug. 12, 2019, XP011738605.

Communication dated Aug. 2, 2023 by the European Patent Office in counterpart European Patent Application No. 20866196.7.

\* cited by examiner

FIG. 9 SERVER KNOWLEDGE GRAPH-BASED CONTENT RECOMMENDATION METHOD(910)

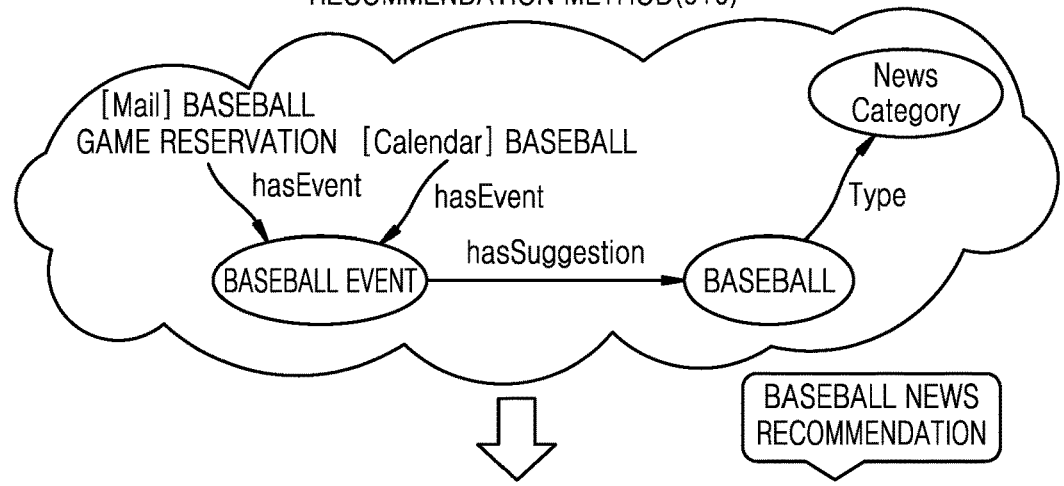

CONTENT RECOMMENDATION METHOD PRIOR TO USER PATTERN ANALYSIS(920)

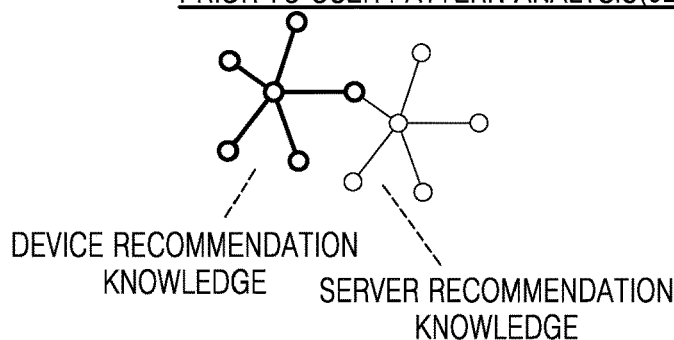

DEVICE RECOMMENDATION KNOWLEDGE  SERVER RECOMMENDATION KNOWLEDGE

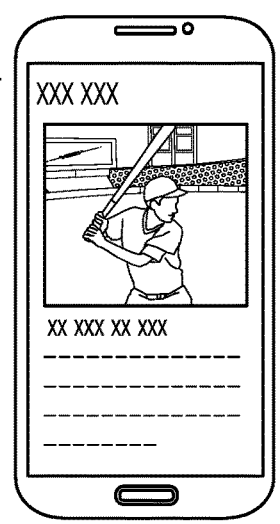

BASEBALL NEWS RECOMMENDATION

CONTENT RECOMMENDATION METHOD AFTER USER PATTERN ANALYSIS(930)

RECOMMENDATION OF YOUTUBE BASEBALL CHANNEL FREQUENTLY WATCHED BY USER

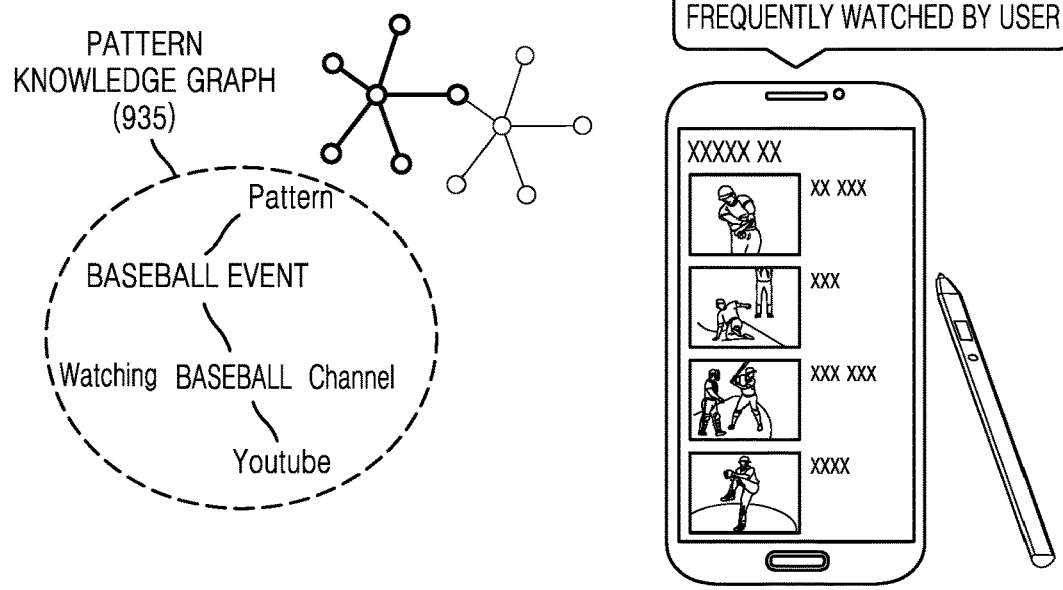

PATTERN KNOWLEDGE GRAPH (935)

Pattern
BASEBALL EVENT
Watching BASEBALL Channel
Youtube

METHOD AND APPARATUS FOR PROVIDING CONTENT BASED ON KNOWLEDGE GRAPH

CROSS-REFERENCE TO RELATED APPLICATION

This application is based on and claims priority under 35 U.S.C. § 119 to Korean Patent Application No. 10-2019-0115474, filed on Sep. 19, 2019, in the Korean Intellectual Property Office, the disclosure of which is incorporated by reference herein in its entirety.

BACKGROUND

1. Field

The disclosure relates to a method and apparatus for providing content based on a knowledge graph. More particularly, the disclosure relates to a method and apparatus for providing content by generating a knowledge graph based on user analysis.

2. Description of Related Art

Unlike an existing rule-based smart system, an artificial intelligence (AI) system is a computer system that performs machine learning and problem solving by itself and becomes more intelligent. As the use of AI systems has increased, a recognition rate thereof has been improved and a user's preference may be understood more accurately. The existing rule-based smart system is gradually replaced with a deep learning-based AI system.

AI technology includes machine learning (deep learning) and element technologies using machine learning. Machine learning is an algorithm technology for classifying and learning characteristics of input data by itself. The element technology is a technology using a machine learning algorithm such as deep learning. The element technology includes technical fields such as linguistic understanding, visual understanding, inference or prediction, knowledge representation, and motion control.

Various fields to which AI technology is applied are as follows. Linguistic understanding is a technology for recognizing, applying, and processing human languages and characters and includes natural language processing, machine translation, dialogue system, query and answer, speech recognition and synthesis, and the like. Visual understanding is a technology for recognizing and processing objects like human vision and includes object recognition, object tracking, image retrieval, person recognition, scene understanding, spatial understanding, image enhancement, and the like. Inference or prediction is a technology for determining, logically inferring, and predicting information and includes knowledge/probability-based inference, optimization prediction, preference-based planning, recommendation, and the like. Knowledge representation is a technology for automatically processing human experience information into knowledge data and includes knowledge construction (data generation and classification), knowledge management (data utilization), and the like. Motion control is a technology for controlling autonomous driving of vehicles and movements of robots and includes movement control (navigation, collision, driving, etc.), operation control (behavior control), and the like.

Also, there is a need for an AI technology capable of effectively expanding a knowledge graph associated with a user through user analysis.

SUMMARY

Provided are a method and apparatus for providing content based on a knowledge graph in an on-device.

Provided are also a method and apparatus for continuously generating and updating a knowledge graph in an on-device.

Provided are also a method and apparatus for separately managing a knowledge graph generated by a server and a knowledge graph generated by a device so as to continuously update a knowledge graph in an on-device.

Provided are a method and apparatus for determining a pattern associated with a user through user analysis and combining the determined pattern with a knowledge graph generated by a server.

Provided are a method and apparatus for determining a pattern associated with a user through user analysis and determining a function to be provided to the user according to the determined pattern.

Additional aspects will be set forth in part in the description which follows and, in part, will be apparent from the description, or may be learned by practice of the presented embodiments of the disclosure.

According to an embodiment of the disclosure, a method of operating a device for generating a knowledge graph includes: obtaining log history information about an operation of the device; generating a device knowledge graph based on the log history information; generating a pattern knowledge graph associated with a behavior pattern of a user of the device based on entities in the device knowledge graph and a relationship between the entities; updating the device knowledge graph by adding the generated pattern knowledge graph to the device knowledge graph; and updating a server knowledge graph generated by a server, based on the generated pattern knowledge graph.

According to another embodiment of the disclosure, a device for providing content based on a knowledge graph includes: a communication interface; a memory storing one or more instructions; and a processor configured to execute the one or more instructions to: obtain log history information about an operation of the device; generate a device knowledge graph based on the log history information; generate a pattern knowledge graph associated with a behavior pattern of a user of the device based on entities in the device knowledge graph and a relationship between the entities; update the device knowledge graph by adding the generated pattern knowledge graph to the device knowledge graph; and update a server knowledge graph generated by a server, based on the generated pattern knowledge graph.

Provided herein is a method of operating a device for generating a knowledge graph, the method including: obtaining log history information about an operation of the device; generating a device knowledge graph based on the log history information; generating a pattern knowledge graph associated with a behavior pattern of a user of the device based on first entities in the device knowledge graph and a relationship between the first entities; updating the device knowledge graph by adding the pattern knowledge graph to the device knowledge graph; updating a server knowledge graph generated by a server, based on the pattern knowledge graph; and providing a content recommendation to the user based on the updated device knowledge graph.

Provided herein is a device for providing content based on a knowledge graph, the device including: a communication interface; a memory storing one or more instructions; and a processor configured to execute the one or more instructions to: obtain log history information about an operation of the device, generate a device knowledge graph based on the log history information, generate a pattern knowledge graph associated with a behavior pattern of a user of the device based on first entities in the device knowledge graph and a relationship between the first entities, update the device knowledge graph by adding the pattern knowledge graph to the device knowledge graph, update a server knowledge graph generated by a server, based on the pattern knowledge graph, and provide a content recommendation to the user based on the updated device knowledge graph.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates an example of server knowledge graph-based content recommendation and device knowledge graph-based content recommendation, according to an embodiment of the disclosure;

DETAILED DESCRIPTION

Figure 1:
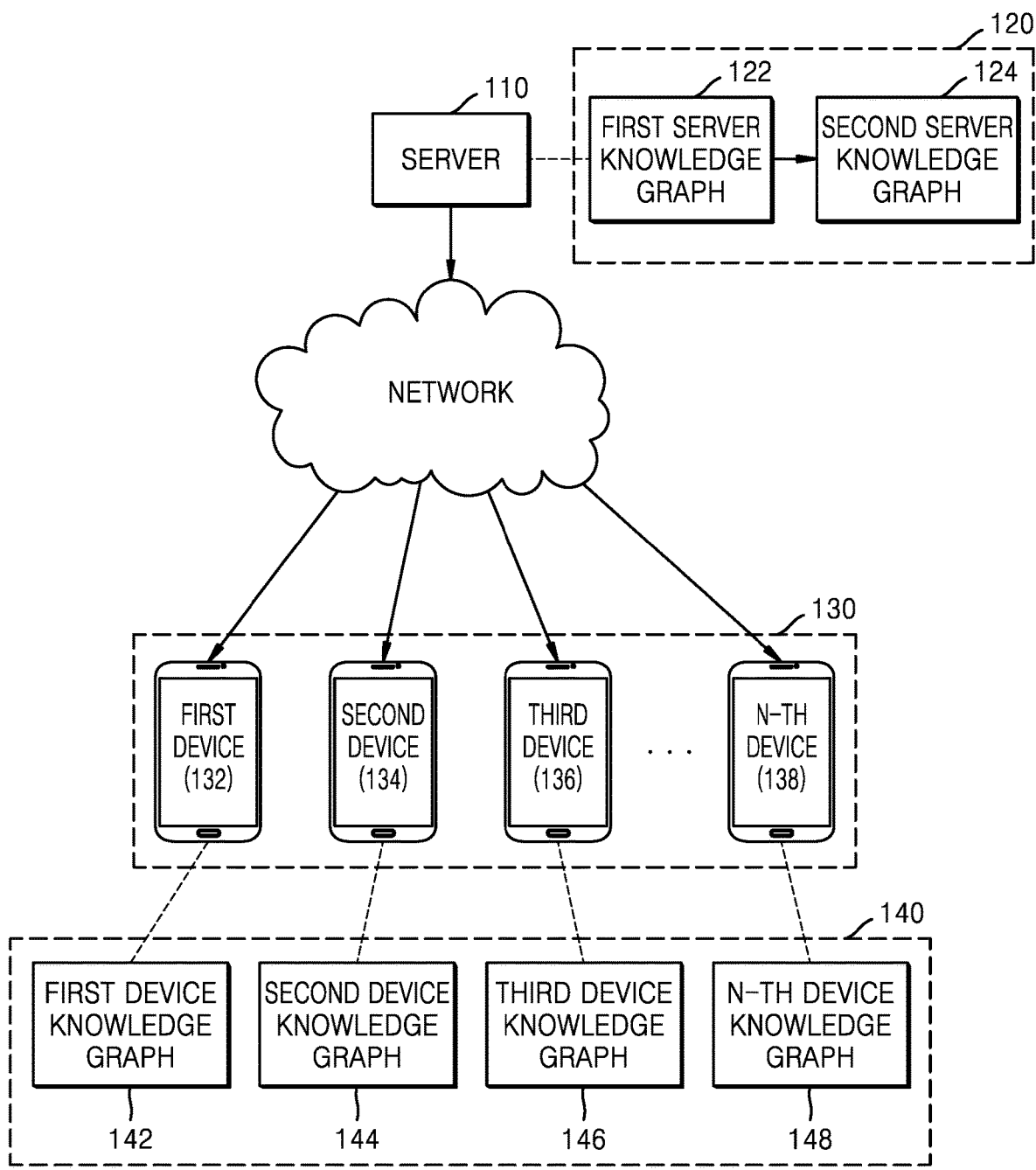
FIG. 1 is a schematic diagram of a system for providing a knowledge graph, according to an embodiment of the disclosure.

Hereinafter, embodiments of the disclosure will be described in detail with reference to the accompanying drawings.

In describing the embodiments of the disclosure, technical contents that are well known in the art to which the disclosure belongs and are not directly associated with the disclosure will not be described. By omitting the unnecessary description, the disclosure is conveyed more clearly without obscuring the subject matter of the disclosure.

For the same reason, some elements in the accompanying drawings are exaggerated, omitted, or schematically illustrated. Also, the size of each element does not reflect the actual size. In each drawing, the same reference numerals are assigned to the same or corresponding elements.

The advantages and features of the disclosure and methods for achieving them will become more apparent from the following embodiments of the disclosure, which are described in detail in conjunction with the accompanying drawings. However, it will be understood that the disclosure is not limited to the following embodiments of the disclosure, and various modifications may be made without departing from the scope of the disclosure. The embodiments of the disclosure set forth herein are provided so that the disclosure will be thorough and complete, and will fully convey the concept of the disclosure to those of ordinary skill in the art. The disclosure should be defined by the appended claims. The same reference numerals denote the same elements throughout the specification.

Throughout the disclosure, the expression "at least one of a, b or c" indicates only a, only b, only c, both a and b, both a and c, both b and c, all of a, b, and c, or variations thereof.

It will be understood that the respective blocks of the flowcharts and the combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be mounted on the computer or other programmable data processing apparatus, the instructions for executing the computer or other programmable data processing apparatus by generating a computer-implemented process by performing a series of operations on the computer or other programmable data processing apparatus may provide operations for executing the functions described in the flowchart block(s).

Also, each block may represent a part of a module, segment, or code that includes one or more executable instructions for executing a specified logical function(s). It should also be noted that, in some alternative implementations, the functions noted in the blocks may occur out of order. For example, two blocks illustrated in succession may in fact be executed substantially concurrently, or the blocks may sometimes be executed in the reverse order, depending on the functions involved.

The term "module" or "-er/or" as used herein refers to a software element or a hardware element such as field programmable gate array (FPGA) or application specific integrated circuit (ASIC), and the term "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program codes, drivers, firmware, microcodes, circuits, data, databases, data structures, tables, arrays, and variables. Functions provided in the elements and the "modules" or "-er/or" may be combined with fewer elements and "modules" or "-er/or", or may be separated from additional elements and "modules" or "-er/or." In addition, the elements and the "modules" or "-er/or" may be implemented to reproduce one or more central processing units (CPUs) in the device or secure multimedia card. Also, in embodiments of the disclosure, the "module" or "-er/or" may include one or more processors.

In general, most recommendation systems are server-based recommendation systems. However, in server-based recommendation systems, only limited information may be transmitted to a server due to a user's privacy concerns, and thus, user-customized recommendation may be difficult. Therefore, on-device knowledge graph-based recommendation systems for recommending content based on a device knowledge graph have been developed. However, in the on-device knowledge graph-based recommendation systems, when recommended content is determined by using only a server knowledge graph received from a server, the actual behaviors and needs of the user of the device may not be reflected.

Technical Problem. A technical problem exists that if a device provides a suggestion, for example, a content recommendation, based on a computational effort of the device, also using memory of the device and the suggestion is unsuitable, the user will ignore or reject the content recommendation and the computational effort and memory usage of the device are not efficient.

Therefore, there is a need to analyze a user's context, behavior pattern, and the like to recommend user-customized content and provide services. Hereinafter, a method is described of providing an appropriate function, to which user characteristics are reflected, to a user by analyzing a behavior pattern associated with a user's current context and providing a function according to the analyzed behavior pattern.

Figure 13:
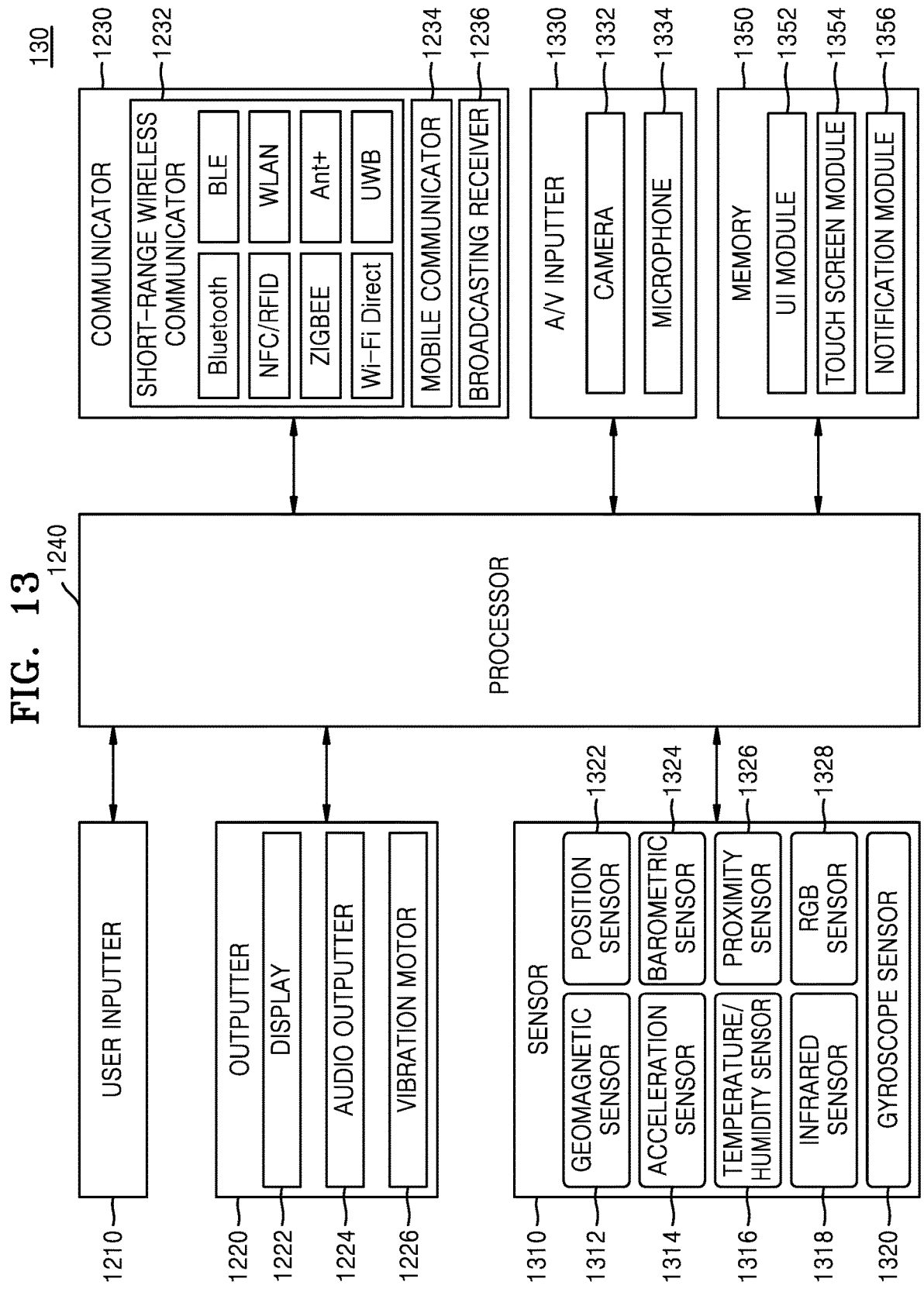
FIG. 13 is a detailed block diagram of the device according to an embodiment of the disclosure.

Technical Solution A technical solution is provided which reflects user characteristics including behavior patterns, and an improvement is provided in the provided suggestion or content recommendation. The provided suggestion or content recommendation is based on computational effort of the device, and also using memory of the device (for an example embodiment, see processor 1240 and memory 1350 of FIG. 13 below) and in some instances device sensor(s) (FIG. 13 item 1310). Acceptance or adoption by the user is increased and the computational effort and memory usage, and possibly sensors. of the device are made more efficient.

In the disclosure, the term "knowledge graph" as used herein may refer to data generated when certain information is structured in an ontology form according to a certain criterion. Generally, components of an ontology are classes, relationships and attributes. For example, the certain information may be expressed in the form of a resource description framework (RDF). RDF is a standard model for data interchange on the Internet. The information expressed in the form of RDF may be expressed in a graph form of node-edge-node. In this case, the node-edge-node may refer to a subject-predicate-object.

Also, in an embodiment of the disclosure, the knowledge graph may refer to data generated in the graph form because certain information such as entities of the real world and relations of the entities are structured in an ontology form according to certain criteria. In an embodiment of the disclosure, the knowledge graph may include configurations such as an entity, an edge, and an attribute.

In an embodiment of the disclosure, the entity may refer to a named object in the real world. For example, the entity may include a person name such as "Tom" or "James Cameron," a sports name such as "baseball," an application name such as "Youtube," or similar. In an embodiment of the disclosure, the entity may refer to a node in the above-described knowledge graph.

In an embodiment of the disclosure, the edge is a configuration that connects the entities and may indicate a connection relationship between the entities. For example, a "baseball" entity and an "interest" entity may be connected through an edge. In the disclosure, the relationship between the entities in the knowledge graph may mean a connection relationship between nodes in the knowledge graph.

In an embodiment of the disclosure, the attribute may refer to specific information about the entity. That is, the attribute may refer to a method of expressing a specific entity. For example, when a "baseball" entity and an "interest" entity are connected by an edge indicating a type, the type of the "baseball" entity may be classified as "interest." At this time, the type may refer to an attribute for the "baseball" entity.

In the disclosure, log history information may mean that information about all contexts occurring inside or around the device is recorded over time. For example, the log history information may refer to data in which information sensed in real time from a temperature and humidity sensor, global positioning system (GPS) data, information about a time when an event occurs, such as a web access history of a user who uses a device and a history of applications a user frequently uses in a device, and a device state (e.g., power, central processing unit (CPU) utilization, memory utilization, etc.) are recorded together. In an embodiment of the disclosure, log history information may be referred to as raw data.

In an embodiment of the disclosure, the log history information may include data indicating the operation of the device. In this case, the data indicating the operation of the device may be collected in the device as the user uses the device. In an embodiment of the disclosure, the data indicating the operation of the device may refer to log history information associated with the operation of the device. For example, the data indicating the operation of the device may include the web access history of the user who uses the device and the history of the applications the user frequently uses in the device, among the pieces of the log history information. Also, the data indicating the operation of the device may refer to data indicating an event or the like that occurs during the execution of software in the device.

In the disclosure, the server knowledge graph may be a knowledge graph generated by the server. The server knowledge graph may be generated by the server, based on data collected from a plurality of devices. In an embodiment of the disclosure, the server knowledge graph may be updated periodically or aperiodically. In an embodiment of the disclosure, the server knowledge graph may be generated so as to support a search engine by a server that manages the search engine, may be generated so as to support a social network service by a server that manages the social network service, or may be generated so as to support a product sales service by a server that manages the product sales service.

In the disclosure, the device knowledge graph may be a knowledge graph generated by a device of a user. The device knowledge graph may be generated based on log history information collected by the device of the user. Because the device knowledge graph is generated based on the log history information of the device of the user, the device knowledge graph may refer to a graph in which knowledge specialized to a user is enhanced, as compared with the above-described server knowledge graph.

In an embodiment of the disclosure, the server knowledge graph generated by the server and the device knowledge graph generated by the device may be individually managed. For example, the server may generate the server knowledge graph by using data collected by the server, and the device may generate the device knowledge graph based on the log history information collected by the device. The server may update the server knowledge graph periodically or aperiodically and may transmit the updated server knowledge graph to the device. The device may update the device knowledge graph based on the server knowledge graph received from the server and the log history information about the device.

In the disclosure, a pattern knowledge graph may refer to a knowledge graph indicating a behavior pattern of the user of the device. The pattern knowledge graph may be generated based on a pattern indicating an association relationship between specific entities. For example, when the user of the device performs a specific behavior (e.g., watching a YouTube associated with a baseball) in a specific context (e.g., reserving a baseball game), an entity indicating the specific context may be connected to an entity indicating the specific behavior. When a structure (e.g., an RDF structure) in which the entity indicating the specific context is connected to the entity indicating the specific behavior is repeated in time series, such a repeated structure may be generated as a pattern. The pattern knowledge graph may mean that the generated pattern is expressed in the form of a knowledge graph having a node-edge-node configuration.

In the disclosure, knowledge data indicating the operation of the device may refer to data obtained by processing the data indicating the operation of the device into data that is available so as to generate the knowledge graph. In an embodiment of the disclosure, the data indicating the operation of the device may be included in the log history information. For example, in the knowledge data, the log history information is processed so that the subject-predicate-object displayed in the knowledge graph form may be expressed in a text form.

Hereinafter, the disclosure will be described in detail with reference to the accompanying drawings.

FIG. 1 is a schematic diagram of a system for providing a knowledge graph, according to an embodiment of the disclosure.

Referring to FIG. 1, the system for providing the knowledge graph may include a server 110, a network, and a device 130. However, the disclosure is not limited thereto.

The server 110 may generate a server knowledge graph 120 based on data received from a plurality of devices (e.g., a first device 132, a second device 134, a third device 136, an N-th device 138, etc.). In an embodiment of the disclosure, the data used for generating the server knowledge graph 120 may be big data generated through web crawling. The server knowledge graph 120 may be referred to as a common knowledge graph.

The server knowledge graph 120 may include one or more server knowledge graphs. For example, the server knowledge graph 120 may include a first server knowledge graph 122 and a second server knowledge graph 124. In an embodiment of the disclosure, the first server knowledge graph 122 may refer to a server knowledge graph generated temporally before the second server knowledge graph 124. Also, the second server knowledge graph 124 may refer to an updated server knowledge graph in the first server knowledge graph 122 based on the data received from the devices or the big data collected through the web crawling.

The device 130 may obtain log history information about the operation of the device 130, receive the server knowledge graph 120 generated by the server 110 from the server 110, and generate a device knowledge graph 140 by using the server knowledge graph 120 and the log history information. A specific example related to the generation of the device knowledge graph 140 will be described below with reference to FIG. 10. Also, the device 130 may generate a pattern knowledge graph associated with the behavior pattern of the user of the device 130 based on the entities in the device knowledge graph 140 and the relationship between the entities. Also, the device 130 may update the device knowledge graph 140 by adding the pattern knowledge graph to the device knowledge graph 140.

In an embodiment of the disclosure, device 130 may collect data from structured sources or unstructured sources so as to obtain knowledge data associated with the generation of the knowledge graph. In an embodiment of the disclosure, the structured sources may include relational databases, feeds, catalogs, directories, and the like. Also, in an embodiment of the disclosure, the unstructured sources may include web pages, texts, speeches, images, videos, and the like.

In an embodiment of the disclosure, the device 130 may collect data from the configurations included in the web pages by using a rule-based, tree-based, or machine learning-based approach.

In an embodiment of the disclosure, the device 130 may collect data from texts. For example, the device 130 may collect personal or professional information about persons included in texts in an email and a calendar, text information included in texts in social media, and the like.

As described above, the device 130 may collect data from the structured sources or the unstructured sources. Also, the device 130 may match data collected from different sources. For example, the device 130 may detect matched entities from the collected data based on probabilistic matching models, distance based models, and declarative matching rules and constraints, and the like. The device 130 may perform a knowledge refinement operation on the detected entities. For example, the device 130 may refine the detected entities by using techniques such as knowledge fusion, error detection, and fact inference. Through the above-described process, the device 130 may obtain knowledge data associated with the generation of the knowledge graph.

The device 130 may refer to one or more devices. For example, the device 130 may include the first device 132, the second device 134, the third device 136, . . . , and/or the N-th device 138.

The device knowledge graph 140 may refer to one or more knowledge graphs. For example, the device knowledge graph 140 may refer to a first device knowledge graph 142, a second device knowledge graph 144, a third device knowledge graph 146, . . . , and/or an N-th device knowledge graph 148. In an embodiment of the disclosure, the device knowledge graph 140 may be updated by using the pattern knowledge graph. In this case, the updated device knowledge graph may also be included in the device knowledge graph 140. Although the devices each having one device knowledge graph are illustrated in FIG. 1, the device 130 may have one or more device knowledge graphs.

The device 130 may be a smartphone, a tablet personal computer (PC), a PC, a smart television (TV), a mobile phone, a personal digital assistant (PDA), a laptop computer, a media player, a micro server, a global positioning system (GPS) device, an e-book terminal, a digital broadcasting terminal, a navigation, a kiosk, an MP3 player, a digital camera, a home appliance, and other mobile or non-mobile computing devices, but the disclosure is not limited thereto. Also, the device 130 may be a wearable device, such as a watch, glasses, a hair band, or a ring, which has a communication function and a data processing function. However, the disclosure is not limited thereto, and the device 130 may include any types of devices capable of transmitting and receiving data through the server 110 and the network.

The network may include a local area network (LAN), a wide area network (WAN), a value added network (VAN), a mobile radio communication network, a satellite communication network, or any combinations thereof. The network is a comprehensive data communication network that enables network configuration entities illustrated in FIG. 1 to efficiently communicate with one another and may include a wired Internet, a wireless Internet, and a mobile wireless communication network.

The wireless communication may be, for example, wireless LAN (Wi-Fi), Bluetooth, Bluetooth Low Energy, Zigbee, Wi-Fi Direct (WFD), ultra wideband (UWB), infrared communication (Infrared Data Association (IrDA)), Near Field Communication (NFC), and the like, but the disclosure is not limited thereto.

In an embodiment of the disclosure, the server 110 may generate the first server knowledge graph 122 based on data collected from devices or big data collected through web crawling. The server 110 may transmit the generated first server knowledge graph 122 to the first device 132. The first device 132 may generate the first device knowledge graph 142 by using the received first server knowledge graph 122 and log history information about the operation of the first device 132. Also, the first device 132 may generate the pattern knowledge graph associated with the behavior pattern of the user of the first device 132 and update the first device knowledge graph 142 by using the generated pattern knowledge graph. In the same manner as described above, the second device 134, the third device 136, . . . , and the N-th device 138 may also generate the second device knowledge graph 144, the third device knowledge graph 146, . . . , and the N-th device knowledge graphs, respectively. Also, the second device 134, the third device 136, . . . , and the N-th device 138 may update the respective generated device knowledge graphs by using the pattern knowledge graphs associated with the behavior patterns of the users of the devices, respectively.

In an embodiment of the disclosure, after the server 110 generates the first server knowledge graph 122, the second server knowledge graph 124 may be generated by using new or added data. In order to use the knowledge graph in the device 130, the server 110 may transmit the second server knowledge graph 124 to the first device 132. However, because the updated first device knowledge graph exists in the first device 132, a collision between the second server knowledge graph 124 and the updated first device knowledge graph may occur at the time of using the knowledge graph.

In an embodiment of the disclosure, because the updated first device knowledge graph includes information about the behavior pattern of the user of the first device 132, the first device 132 does not use the second server knowledge graph 124 and may use the updated first device knowledge graph. Alternatively, the first device 132 may generate a new device knowledge graph based on the second server knowledge graph 124 and the updated first device knowledge graph. Hereinafter, methods of generating the device knowledge graph 140 and updating the device knowledge graph 140 based on a pattern knowledge graph, according to specific embodiments of the disclosure, will be described.

Figure 2:
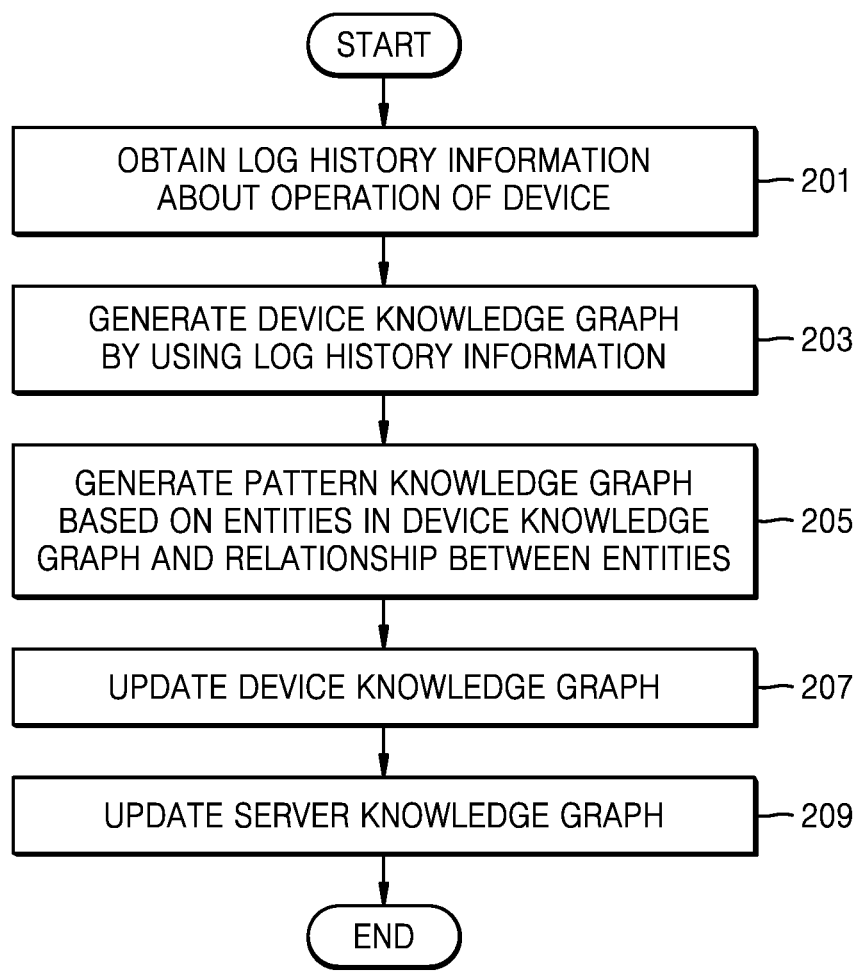
FIG. 2 is a flowchart of a method, performed by a device, of generating a knowledge graph according to an embodiment of the disclosure.

FIG. 2 is a flowchart of a method, performed by the device 130, of generating a knowledge graph, according to an embodiment of the disclosure.

Referring to FIG. 2, in operation 201, the device 130 may obtain log history information about the operation of the device 130. That is, the device 130 may collect log data generated as the user of the device 130 uses the device 130. For example, when the user of the device 130 inputs and searches baseball in an Internet search window, the device 130 may obtain log history information about the search record.

In operation 203, the device 130 may generate the device knowledge graph 140 based on the log history information. For example, the device 130 may convert the log history information into knowledge data. The device 130 may generate the device knowledge graph 140 by connecting at least one of the entities of the server knowledge graph 120 to the knowledge data based on the relationship between the knowledge data and the entities of the server knowledge graph 120 stored in the device 130.

In operation 205, the device 130 may generate the pattern knowledge graph based on the entities in the device knowledge graph 140 and the relationship between the entities. For example, the device 130 may identify the entities associated with the behavior of the user of the device 130 and the entities associated with the context from the device knowledge graph 140 generated in operation 205. The device 130 may generate the pattern knowledge graph based on the correspondence relationship between the identified entities.

In operation 207, the device 130 may update the device knowledge graph 140. For example, the device 130 may update the device knowledge graph 140 by connecting the pattern knowledge graph generated in operation 205 to the device knowledge graph 140 generated in operation 203.

In operation 209, the device 130 may update the server knowledge graph 120 based on the pattern knowledge graph. For example, the device 130 may update the server knowledge graph 120 by connecting the entities in the pattern knowledge graph to the entities of the server knowledge graph 120.

As described with reference to FIG. 2, the device knowledge graph 140 may be generated based on the log history information or the like, the pattern knowledge graph may be generated from the generated device knowledge graph 140, and the device knowledge graph 140 and the server knowledge graph 120 may be updated by using the generated pattern knowledge graph. That is, based on the generated pattern knowledge graph, the device knowledge graph 140 generated by the device 130 and the server knowledge graph 120 generated by the server 110 may be individually managed. Although not illustrated in FIG. 2, the device 130 may transmit the updated server knowledge graph 120 to the server 110, and the server 110 may use the received updated server knowledge graph 120 to expand the server knowledge graph 120 and transmit the expanded server knowledge graph back to the device 130.

Figure 3:
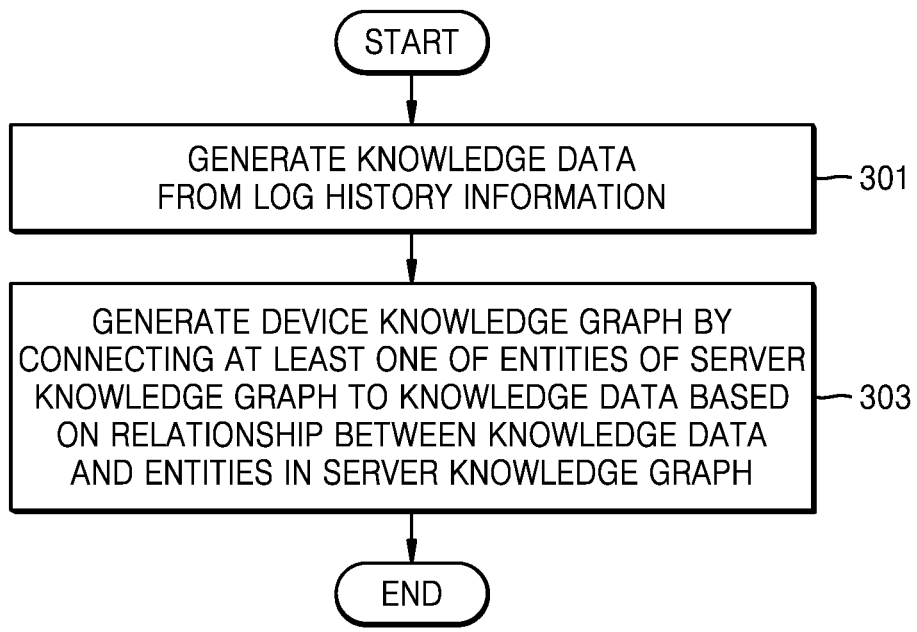
FIG. 3 is a flowchart of a method, performed by a device, of generating a device knowledge graph according to an embodiment of the disclosure.

As described below, FIG. 3 illustrates a method of generating the device knowledge graph 140.

FIG. 3 is a flowchart of a method, performed by the device 130, of generating the device knowledge graph 140, according to an embodiment of the disclosure. In an embodiment of the disclosure, operations of FIG. 3 may be included in operation 205 of FIG. 2.

Referring to FIG. 3, in operation 301, the device 130 may generate knowledge data from log history information. For example, the device 130 may generate knowledge data by inputting log history information to a knowledge graph generation model. In an embodiment of the disclosure, the knowledge graph generation model may refer to a data generation model that, when data such as log history information is input, processes the input data and outputs knowledge data for generating the knowledge graph. Using the knowledge graph generation model, the device 130 may obtain knowledge data expressed in a text form from the log history information.

In operation S303, the device 130 may generate the device knowledge graph 140 by connecting at least one of the entities of the server knowledge graph 120 to the knowledge data based on the relationship between the knowledge data and the entities in the server knowledge graph 120. For example, the device 130 may receive, from the server 110, the server knowledge graph 120 generated by the server 110 and store the received server knowledge graph 120 in the memory of the device 130. The device 130 may select one or more of the entities in the stored server knowledge graph 120 so as to connect the knowledge data. That is, the device 130 may select an entity associated with the knowledge data, from among the entities in the server knowledge graph 120. The device 130 may expand the server knowledge graph 120 by connecting the knowledge data to the entities in the selected server knowledge graph 120. The device knowledge graph 140 may be generated through the expansion of the server knowledge graph 120 as described above.

In an embodiment of the disclosure, specific examples associated with FIG. 3 are as follows. The device 130 may obtain log history information about a schedule (e.g., a baseball game) described in a calendar application, such as {calendar, "baseball game," 20190705:17:00, 20190705:21:00}. The device 130 may generate knowledge data, such as {CalendarActivity, hasTitle, "baseball game"}, from the obtained log history information. In this case, the knowledge data may indicate that the name of the schedule described in the calendar application is the baseball game.

The device 130 may connect the knowledge data to the server knowledge graph 120. For example, the knowledge data and the server knowledge graph 120 may be connected or associated as follows {CalendarActivity, hasMeaning, Baseball_Event}. In this case, {CalenderActivity} may refer to knowledge data, and {Baseball_Event} may refer to the entity included in the server knowledge graph 120. {CalendarActivity, hasMeaning, Baseball_Event} may indicate that the schedule described in the calendar application is the baseball event. As described above, the device knowledge graph 140 may be generated by connecting the knowledge data to the server knowledge graph 120.

Figure 4:
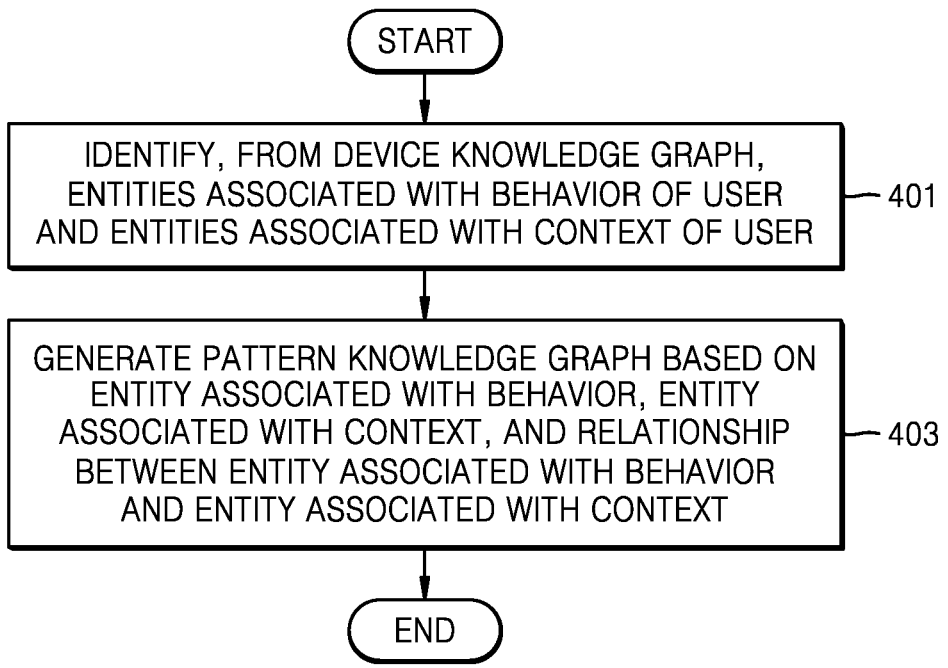
FIG. 4 is a flowchart of a method, performed by a device, of generating a pattern knowledge graph according to an embodiment of the disclosure.

FIG. 4 is a flowchart of a method, performed by the device 130, of generating the pattern knowledge graph, according to an embodiment of the disclosure. In an embodiment of the disclosure, operations of FIG. 4 may be included in operation 207 of FIG. 2.

Referring to FIG. 4, in operation 401, the device 130 may identify, from the device knowledge graph 140, the entities associated with the behavior of the user and the entities associated with the context of the user. In an embodiment of the disclosure, the device knowledge graph 140 may include the entities associated with the behavior of the user of the device 130. For example, the behavior of the user may include the user's application usage, uniform resource locator (URL) access, and video reproduction on the device 130. The device knowledge graph 140 may include entities that are learned from the user's application usage history, URL access history, and video reproduction history. For example, the device knowledge graph 140 may include an entity indicating a video reproduction application, based on the user's video reproduction application usage history on the device 130.

Also, the device knowledge graph 140 may include entities associated with the context of the user of the device 130. For example, the context of the user may refer to a context in which the user of the device 130 is placed in the past, present, or future, such as the schedule described in the calendar application of the device 130. For example, when the baseball game is described in the calendar application of the device 130, the device knowledge graph 140 may include an entity indicating baseball. In this case, the entity indicating baseball may refer to a context associated with baseball.

In operation 403, the device 130 may generate the pattern knowledge graph based on the entity associated with the behavior, the entity associated with the context, and the relationship between the entity associated with the behavior and the entity associated with the context. For example, when the user performs a specific behavior in a specific context at the time of using the device 130, the device 130 may determine a connection relationship between the specific context and the specific behavior. For example, the device 130 may identify the entity indicating baseball when the user inputs a search word related to baseball on the device 130. Also, when the user inputs a search word related to baseball and then executes a video reproduction application, an entity indicating the video reproduction application may be identified.

The device 130 may generate the pattern knowledge graph indicating the behavior pattern of the user by connecting the entity indicating baseball to the entity indicating the video reproduction application. That is, the device 130 may determine the pattern in which the user executes the video reproduction application in the context associated with baseball.

Figure 5A:
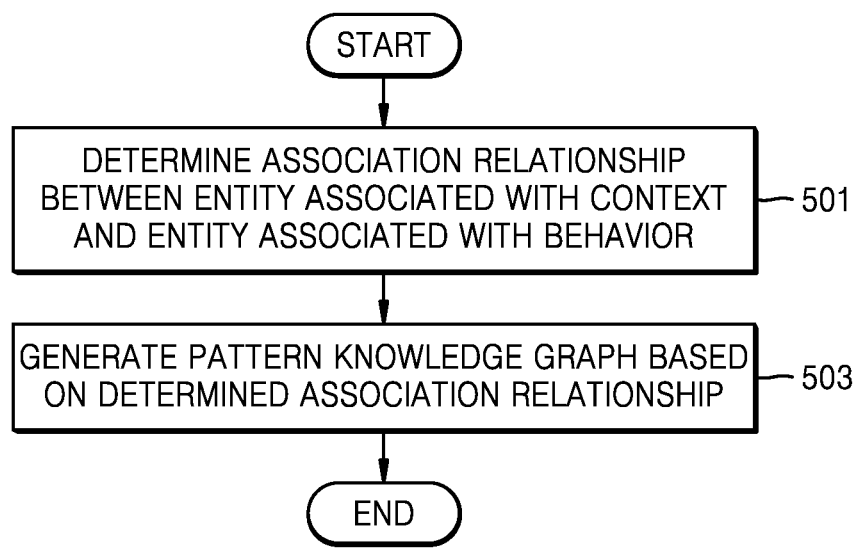
FIG. 5A is a flowchart of a method, performed by a device, of generating a pattern knowledge graph according to a correspondence relationship between entities, according to an embodiment of the disclosure.

FIG. 5A is a flowchart of a method, performed by the device 130, of generating a pattern knowledge graph according to an association relationship between entities, according to an embodiment of the disclosure. In an embodiment of the disclosure, operations of FIG. 5A may be included in operation 403 of FIG. 4.

Referring to FIG. 5A, in operation 501, the device 130 may determine an association relationship between an entity associated with a context and an entity associated with a behavior. In an embodiment of the disclosure, the association relationship between the entities may refer to a relationship in which the entities are connected to each other in the knowledge graph. For example, the device 130 may identify an entity indicating baseball as the entity associated with the context of the user. The device 130 may identify an entity associated with a video reproduction application as the entity associated with the behavior of the user. When the user inputs a search word related to baseball and then executes a video reproduction application, the device 130 may determine an association relationship in which an entity indicating baseball and an entity indicating the video reproduction application are associated with each other.

In operation 503, the device 130 may generate a pattern knowledge graph based on the determined association relationship. In an embodiment of the disclosure, the device 130 may generate a pattern for generating the pattern knowledge graph based on the association relationship between the entity associated with the context and the entity associated with the behavior. For example, the entity associated with the context and the entity associated with the behavior may be connected to form an RDF structure. In this case, when the same RDF structure is repeated in time series, the repeated RDF structure may be generated as a pattern. In some embodiments, the number of occurrences of the same RDF structure is counted. When the counted number meets or exceeds a specific threshold, the repeated RDF structure is considered to be a pattern.

For example, the entity indicating baseball and the entity indicating the video reproduction application may be connected to form the RDF structure. When the RDF structure in which the entity indicating baseball and the entity indicating the video reproduction application are connected is repeated in time series, the repeated RDF structure may be generated as a pattern. That is, the structure in which the entity indicating baseball and the entity indicating the video reproduction application are connected may be generated as a pattern. The device 130 may generate the pattern knowledge graph indicating the behavior pattern of the user based on the generated pattern. The device 130 may store the generated pattern knowledge graph in the memory of the device 130 and may use the stored pattern knowledge graph to update the device knowledge graph 140.

Figure 5B:
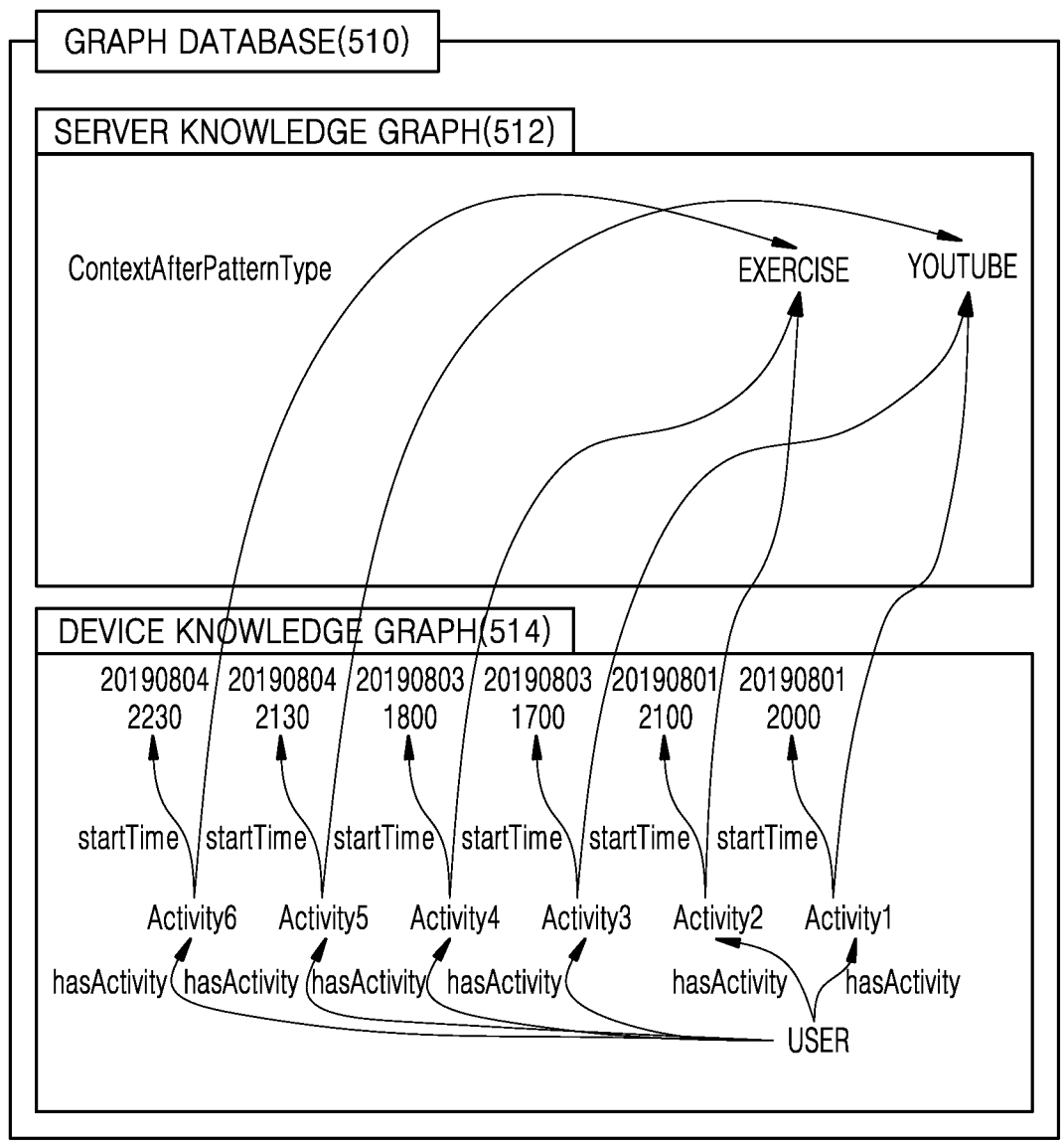
FIG. 5B illustrates an example of generating a device knowledge graph, according to an embodiment of the disclosure.
Figure 5C:
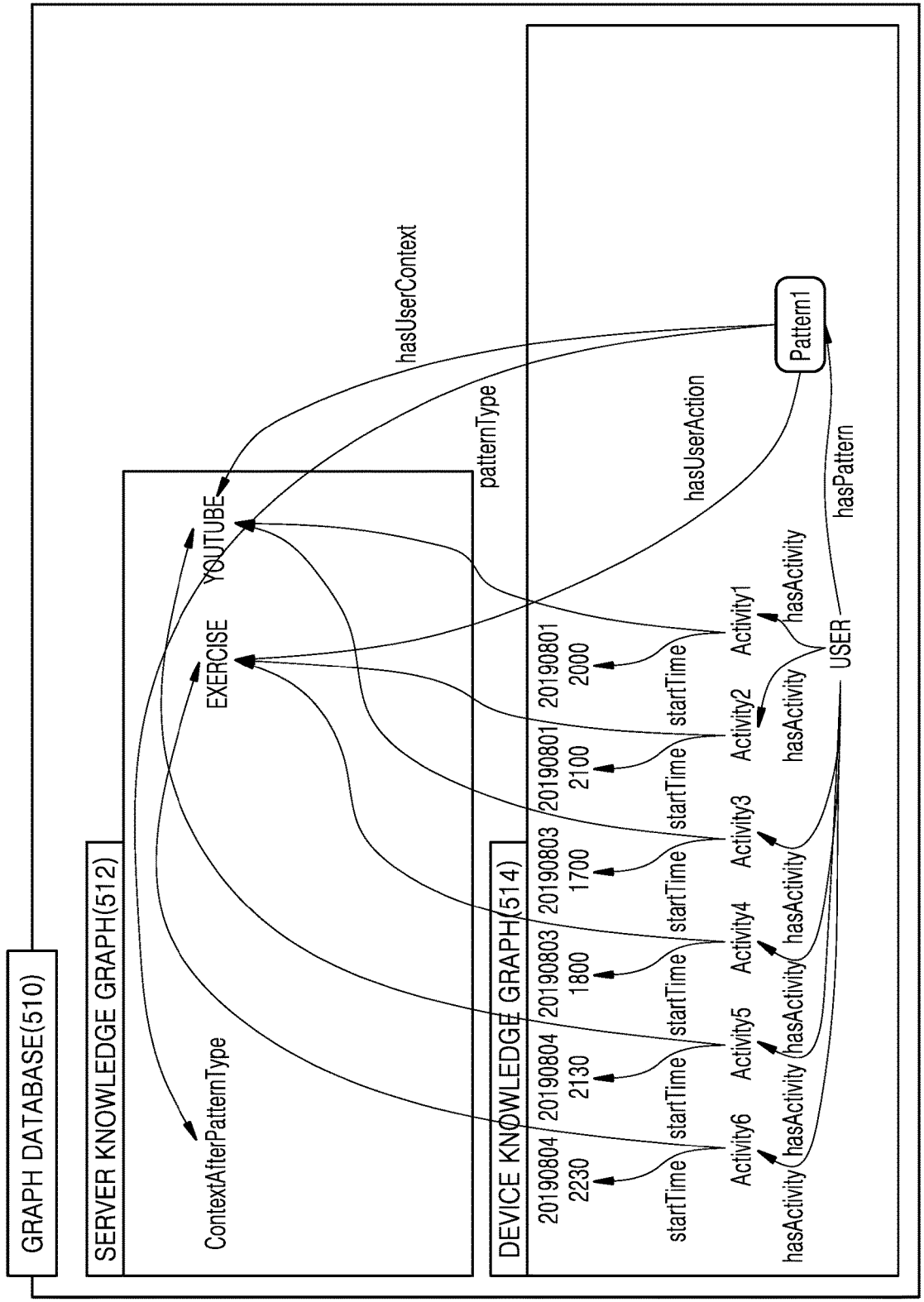
FIG. 5C illustrates an example of generating a pattern, according to an embodiment of the disclosure.
Figure 5D:
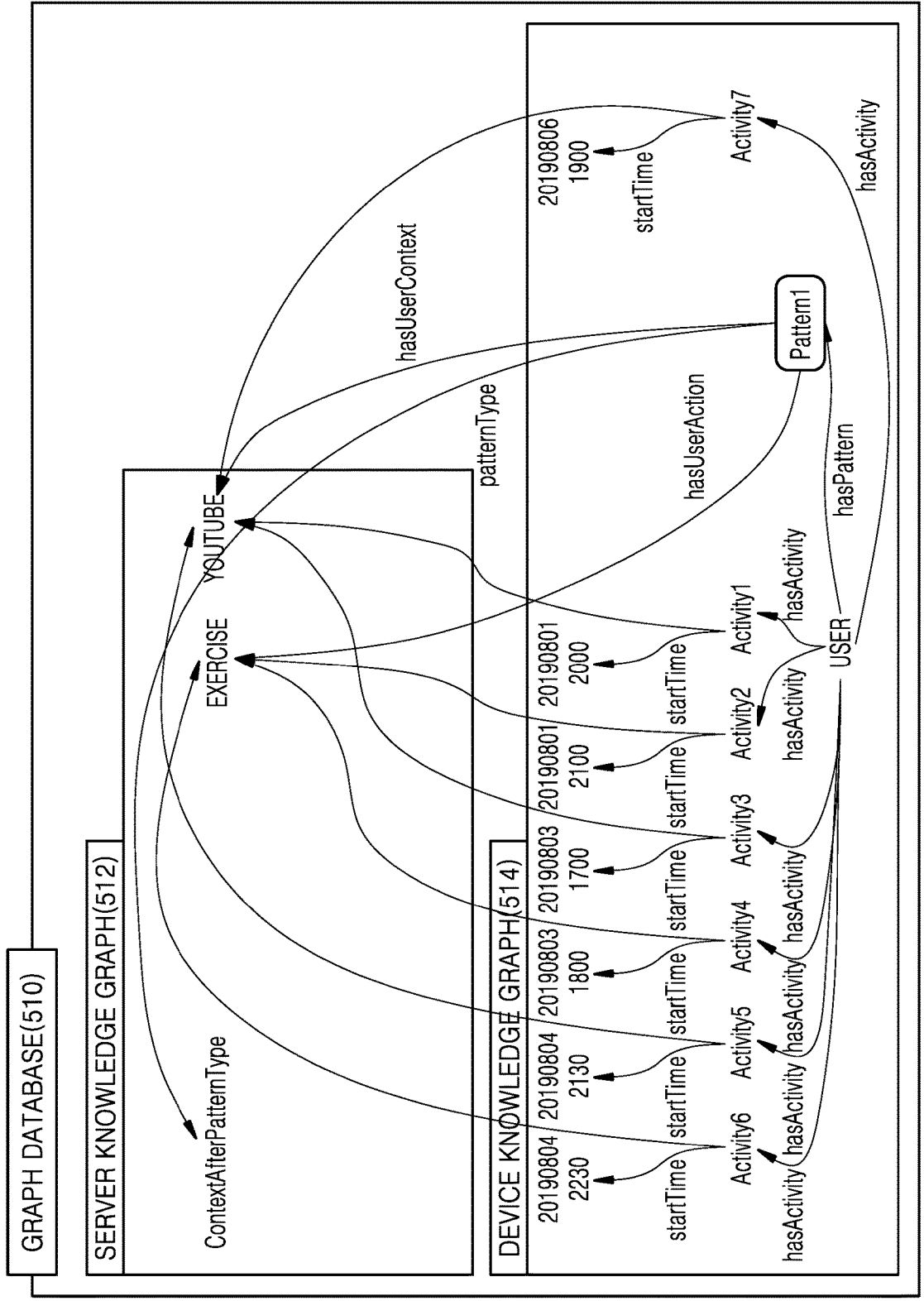
FIG. 5D illustrates an example of recommending content based on a pattern, according to an embodiment of the disclosure.

According to an embodiment of the disclosure, the pattern may mean that the user performs a specific behavior frequently (e.g., a specific threshold or more, as mentioned above, for example) under various conditions. The device 130 may analyze behaviors in the device 130 used by the user to identify which behavior the user frequently performs under various conditions and pattern the behavior of the user accordingly. When the user corresponds to a specific condition, the device 130 may make a recommendation associated with a specific behavior to the user based on the pattern of the user. For example, when the user watches the video reproduction application (e.g., Youtube) and then repeats the behavior of going to exercise 100 times during a month, the device 130 may determine the behavior of going to exercise as a pattern occurring after watching the video reproduction application. Thereafter, when the user executes the video reproduction application through the device 130, the device 130 may make a recommendation (e.g., notification display, vibration, etc.) associated with going to exercise to the user. FIGS. 5B to 5D illustrate specific examples of pattern determination.

In FIGS. 5B to 5D, a graph database 510 may be included in the device 130. The graph database 510 may include a server knowledge graph 512 and a device knowledge graph 514. The server knowledge graph 512 is a knowledge graph constructed in the server 110 and stored in the device 130 and may refer to a knowledge graph indicating common knowledge or knowledge associated with recommendation. The server knowledge graph 512 may correspond to the server knowledge graph 120 of FIG. 1. Also, the device knowledge graph 514 is a knowledge graph constructed in the device 130 and may correspond to the device knowledge graph 140 of FIG. 1.

According to an embodiment of the disclosure, the user may repeatedly perform a specific behavior under a specific condition. When the number of times the specific behavior is repeatedly performed under a specific condition is greater than or equal to a threshold value, the device 130 may recognize the user's repeated behaviors of greater than or equal to the threshold value as a pattern. The pattern recognition of the device 130 may be determined based on various measured values in addition to the above-described threshold value.

For example, when the user has used the device 130 for a month, the device knowledge graph 514 as illustrated in FIG. 5B may be generated. The user may repeatedly perform an activity of going to exercise after an activity of watching YouTube. As illustrated in FIG. 5B, when the user of the device 130 goes to exercise, an activity entity in the device knowledge graph 514 may be connected to an entity associated with exercise in the server knowledge graph 512. When the user of the device 130 watches YouTube, an activity entity in the device knowledge graph 514 may be connected to an entity associated with YouTube in the server knowledge graph 512.

In an embodiment of the disclosure, when a behavior repeated three times or more per month is set as a pattern, the exercise after watching YouTube may be determined as the pattern of the user of the device 130. When the pattern is determined as described above, the pattern of the user may be learned as illustrated in FIG. 5C. That is, the user's pattern of exercise after watching YouTube may be expressed as a Pattern 1 entity of the device knowledge graph 514. However, an ontology schema for the pattern may be variously expressed and is not limited to the example illustrated in FIG. 5C. FIG. 5D illustrates an example in which the device 130 performs content recommendation to a user based on a pattern.

Referring to FIG. 5D, the device 130 may provide content recommendation to the user of the device 130 by utilizing knowledge of the above-described pattern and a predefined inference rule. For example, in FIG. 5C, when the user of the device 130 performs an activity associated with YouTube, such as Activity7, the device 130 may use the knowledge of Pattern 1 to predict that the user will perform an activity associated with exercise. Therefore, the device 130 may recommend content associated with the exercise to the user. For example, the device 130 may display a notification associated with exercise on the display of the device 130 or may output vibration or sound. That is, the device 130 may predict what behavior the user of the device 130 will perform, based on inferences and patterns based on queries or rules, and make a recommendation associated therewith.

Figure 6A:
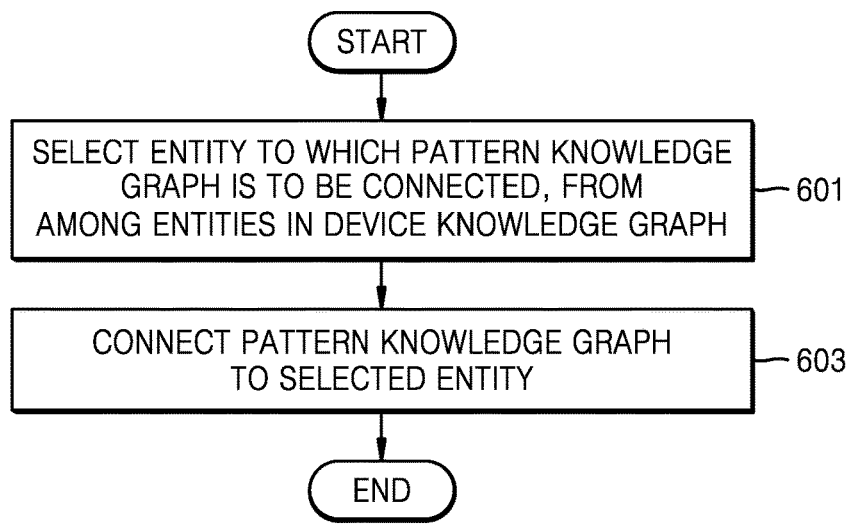
FIG. 6A is a flowchart of a method, performed by a device, of updating a device knowledge graph, according to an embodiment of the disclosure.

FIG. 6A is a flowchart of a method, performed by the device 130, updating a device knowledge graph, according to an embodiment of the disclosure. In an embodiment of the disclosure, operations of FIG. 6A may be included in operation 209 of FIG. 2.

Referring to FIG. 6A, in operation 601, the device 130 may select an entity to which the pattern knowledge graph is to be connected, from among the entities in the device knowledge graph 140. For example, the device 130 may identify one or more entities for connecting the pattern knowledge graph, from among the entities in the stored device knowledge graph 140. For example, when an entity indicating a user is included in the device knowledge graph 140, the device 130 may select the entity indicating the user so as to connect the pattern knowledge graph. A specific method, performed by the device 130, of selecting the entity for connecting the pattern knowledge graph will be described below.

In operation 603, the device 130 may connect the pattern knowledge graph to the selected entity. For example, the device 130 may select the entity indicating the user from among the entities included in the device knowledge graph 140 and connect the pattern knowledge graph to the entity indicating the user. That the pattern knowledge graph indicating the pattern is connected to the entity indicating the user may mean that a behavior pattern of the user of the device 130 is a behavior pattern indicated by the pattern knowledge graph. For example, a pattern knowledge graph including an entity indicating baseball and an entity indicating a video reproduction application may be connected to the entity indicating the user in the device knowledge graph 140. In this manner, when the user of the device 130 is placed in a context associated with baseball, a pattern of executing the video reproduction application may be expressed. As described above, the device knowledge graph 140 may be updated by connecting the pattern knowledge graph to some entities selected from the device knowledge graph 140. That is, the updated device knowledge graph 140 may include information about a behavior pattern of a user.

In an embodiment of the disclosure, a specific method, performed by the device 130, of selecting the entity so as to connect the pattern knowledge graph is as follows.

In an embodiment of the disclosure, the device 130 may select an entity to which the pattern knowledge graph is to be connected, based on name similarity, instance similarity, or structure similarity.

Figure 6B:
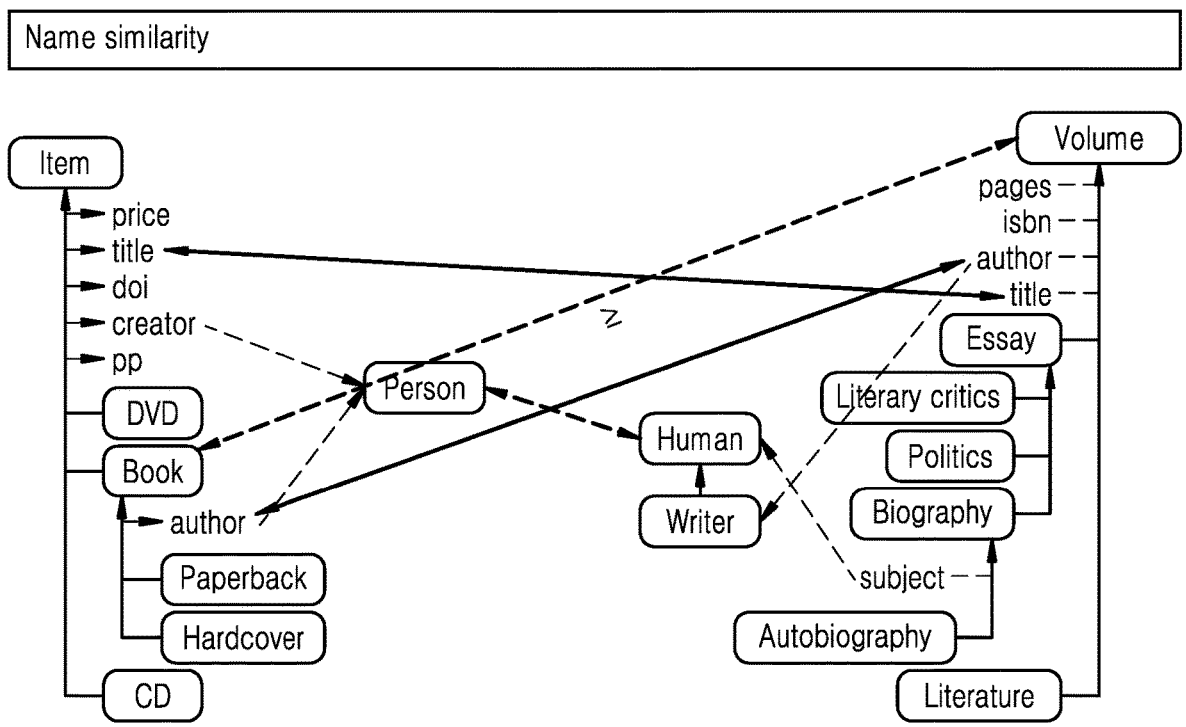
FIG. 6B illustrates an example of combining entities based on name similarity, according to an embodiment of the disclosure.

In an embodiment of the disclosure, the name similarity may refer to label similarity of sub-attributes of each class. The device 130 may confirm the similarity of the class by comparing the names of the sub-attributes of the class (or entity) included in each of a plurality of graphs. The classes may be combined based on the confirmed similarity. For example, referring to FIG. 6B, knowledge graph 1 having classes such as Item, DVD, Book, and CD and knowledge graph 2 having classes such as Volume, Essay, and Literature may exist.

In an embodiment of the disclosure, a name of a title attribute that is one of the sub-attributes of the Item class of knowledge graph 1 may be identical to a name of a title attribute that is one of the sub-attributes of the Volume class of knowledge graph 2. Because the sub-attributes having the same name exist, the device 130 may determine that the Item class of knowledge graph 1 and the Volume class of knowledge graph 2 are similar to each other. The device 130 may select the Volume class of knowledge graph 2 as an entity to be connected to the Item class of knowledge graph 1 and may combine the Item class of knowledge graph 1 with the Volume class of knowledge graph 2.

Figure 6C:
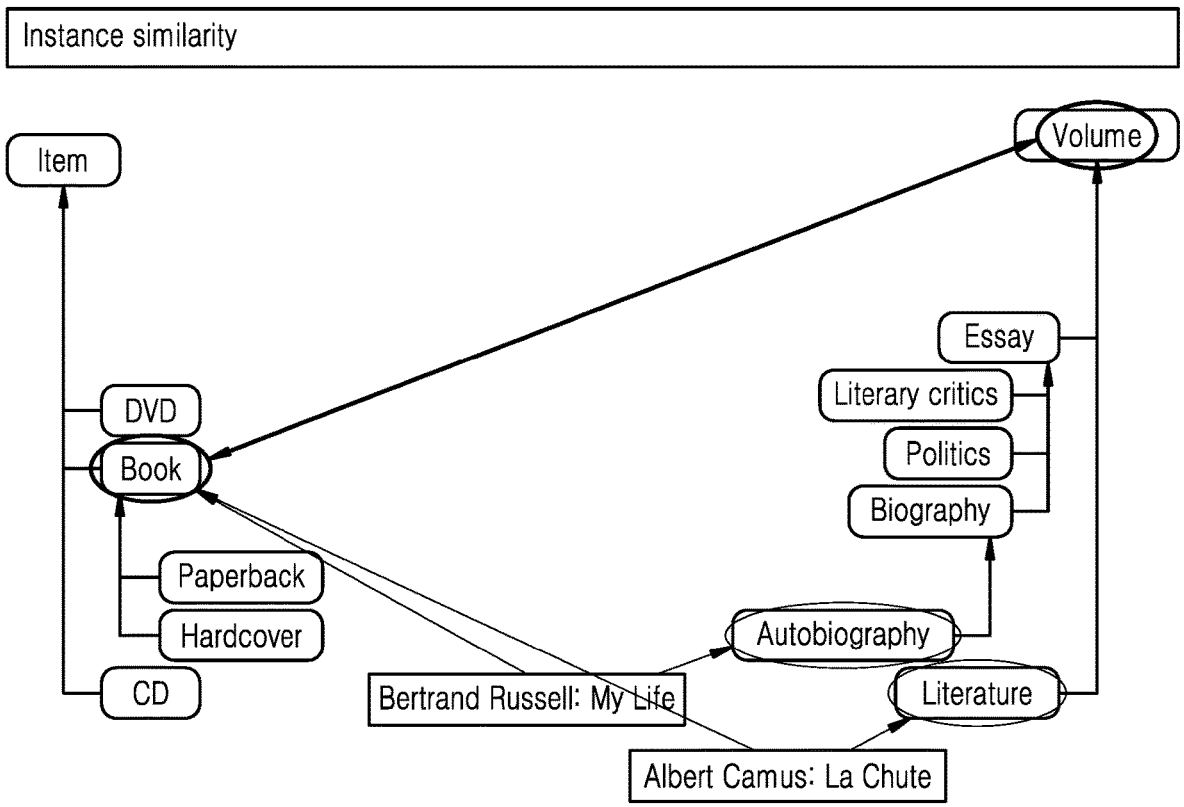
FIG. 6C illustrates an example of combining entities based on instance similarity, according to an embodiment of the disclosure.

In an embodiment of the disclosure, the instance similarity may refer to similarity of instances belonging to each class. The device 130 may combine classes based on the similarity of instances belonging to the class included in each of a plurality of graphs. For example, referring to FIG. 6C, knowledge graph 1 having classes such as Item, DVD, Book, and CD and knowledge graph 2 having classes such as Volume, Essay, and Literature may exist.

In an embodiment of the disclosure, a Book class of knowledge graph 1 may include instances such as Bertrand Russell: My Life, Albert Camus: La Chute. Also, a Volume class of knowledge graph 2 may include instances such as Bertrand Russell: My Life, Albert Camus: La Chute. Because the instances of the Book class of knowledge graph 1 and the instances of the Volume class of knowledge graph 2 are identical to each other, the device 130 may determine that the Book class of knowledge graph 1 and the Volume class of knowledge graph 2 are similar to each other. The device 130 may select the Volume class of knowledge graph 2 as an entity to be connected to the Book class of knowledge graph 1 and may combine the Book class of knowledge graph 1 with the Volume class of knowledge graph 2.

Figure 6D:
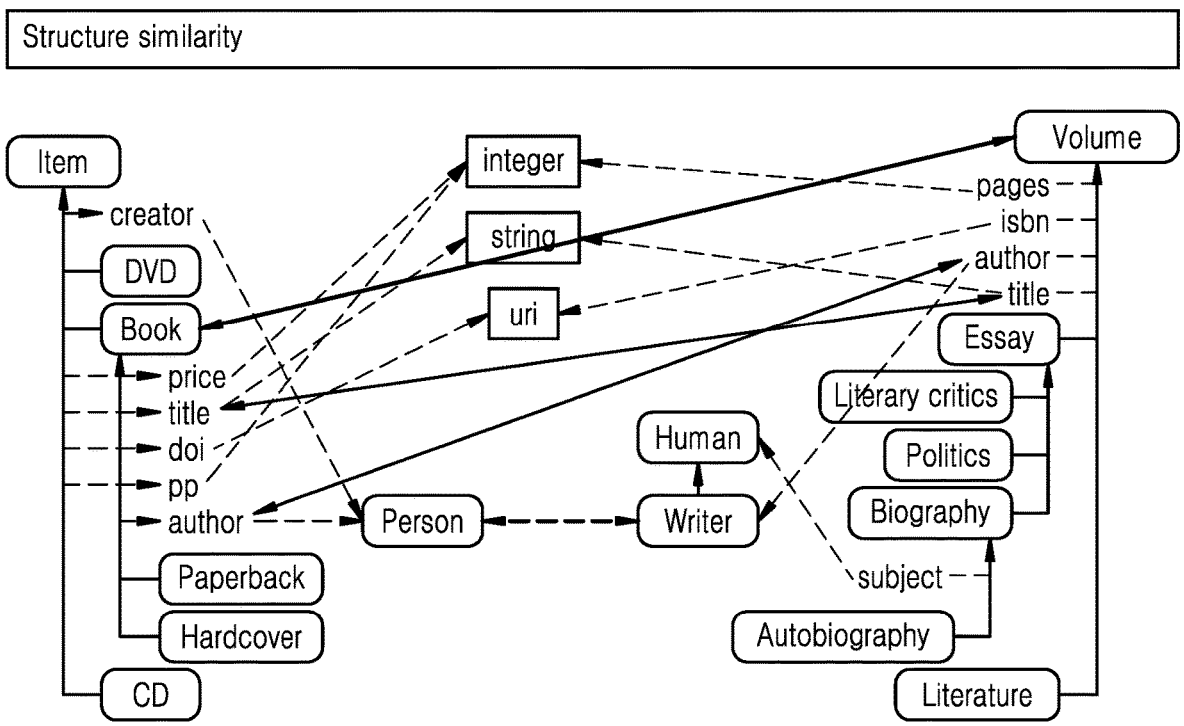
FIG. 6D illustrates an example of combining entities based on structure similarity, according to an embodiment of the disclosure.

In an embodiment of the disclosure, the structure similarity may refer to the similarity of data type and configuration of sub-attributes of each class. The device 130 may confirm the similarity of the class by comparing the similarity of the data type and the configuration of the sub-attributes of the class included in each of a plurality of graphs. The classes may be combined based on the confirmed similarity. For example, referring to FIG. 6D, knowledge graph 1 having classes such as Item, DVD, Book, and CD and knowledge graph 2 having classes such as Volume, Essay, and Literature may exist.

In an embodiment of the disclosure, the Book class of knowledge graph 1 may include sub-attributes such as price, title, doi, pp, and author. The Volume class of knowledge graph 2 may include sub-attributes such as pages, isbn, author, and title. In this case, the Book class of knowledge graph 1 and the Volume class of knowledge graph 2 may have the same sub-attributes such as title and author. Also, because price and pp among the sub-attributes of the Book class of knowledge graph 1 and pages among the sub-attributes of the Volume class of knowledge graph 2 are all expressed as integer, prince, pp, and pages may be determined as similar data. pp is a term referring to a page range of a book, and pp. 3-6 may mean pages 3 to 6 of the book. Also, because title among the sub-attributes of the Book class of knowledge graph 1 and title among the sub-attributes of the Volume class of knowledge graph 2 are all expressed as string, titles may be determined as similar data. Also, doi (digital object identifiers) among the sub-attributes of the Book class of knowledge graph 1 and isbn (international standard book number) among the sub-attributes of the Volume class of knowledge graph 2 are expressed as uniform resource identifier (uri), doi and isbn may be determined as similar data.

As described above, because the device 130 determines that the configuration and data of the sub-attributes of the Book class of knowledge graph 1 are similar to the configuration and data of the sub-attributes of the Book class of knowledge graph 2, the device 130 may select the Volume class of knowledge graph 2 as an entity to be connected to the Book class of knowledge graph 1 and combine the Book class of knowledge graph 1 with the Volume class of knowledge graph 2.

According to an embodiment of the disclosure, the method of updating the device knowledge graph based on the pattern knowledge graph described above with reference to FIG. 6A may be equally applied to the method of updating the server knowledge graph based on the pattern knowledge graph. For example, the device 130 may select at least one entity to which the pattern knowledge graph is to be connected, from among the entities in the server knowledge graph 120. The device 130 may connect the pattern knowledge graph to the selected at least one entity. Because the method of selecting the entity to which the pattern knowledge graph is to be connected has been described in the method of updating the device knowledge graph described above, a description thereof is omitted for convenience.

Figure 7:
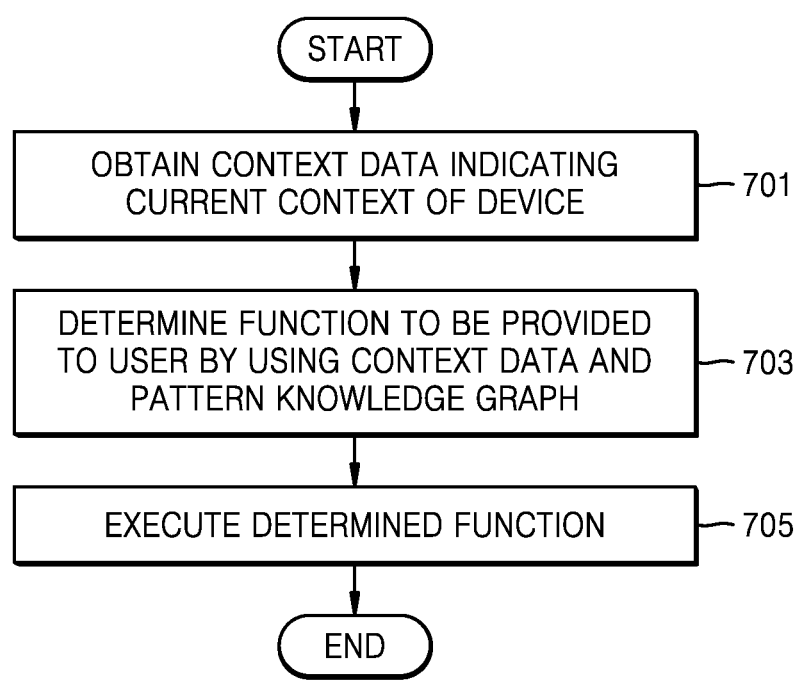
FIG. 7 is a flowchart of a method, performed by a device, of providing a function by using a pattern knowledge graph, according to an embodiment of the disclosure.

FIG. 7 is a flowchart of a method, performed by the device 130, of providing a function by using a pattern knowledge graph, according to an embodiment of the disclosure.

Referring to FIG. 7, in operation 701, the device 130 may obtain context data indicating the current context of the device 130. The current context of the device 130 may refer to a specific environment in which the current device 130 is placed. For example, the current context of the device 130 may be determined by the location of the current device 130, whether the user uses the device 130, or the like.

In an embodiment of the disclosure, the context data may refer to information about the current context of the device 130. For example, when the user of the device 130 goes to see a baseball game, the device 130 may confirm that the current location of the device 130 is in a baseball stadium and may determine the current context of the device 130 as a context associated with the baseball game. Also, the device 130 may obtain information about the baseball game as the context data.

Also, when the user of the device 130 is sleeping, the device 130 may confirm that the user is not using the device 130 for a specific time and may determine the current context of the device 130 as a context in which the user is sleeping. Also, the device 130 may obtain information about the user's sleep as the context data.

For example, when the user of the device 130 is located in the user's home, the device 130 may confirm the current location of the device 130 and may determine the current context of the device 130 as a context in which the user is located in the user's home. Also, the device 130 may obtain information about the context in which the user is located in the user's home as the context data.

In operation 703, the device 130 may determine a function to be provided to the user by using the context data and the pattern knowledge graph. That is, the device 130 may use the context data to determine what context the user of the device 130 is currently in. In the pattern knowledge graph, an entity associated with the determined current context may be identified. For example, when the context data includes information about baseball, the device 130 may determine that the user of the device 130 is in a context associated with baseball. The device 130 may determine, from the pattern knowledge graph, what behavior the user mainly performs in the context indicated by the context data. For example, when the context indicated by the context data is baseball, the device 130 may identify an entity associated with baseball and an entity associated with a video reproduction application from the pattern knowledge graph. The device 130 may determine the pattern in which the user mainly executes the video reproduction application in the context associated with baseball, based on the connection relationship between the identified entities. Therefore, the device 130 may determine to execute the video reproduction application as the function to be provided to the user. In an embodiment of the disclosure, the process of determining the function to be provided to the user may include determining recommended content to be provided to the user.

In operation 705, the device 130 may execute the determined function. In an embodiment of the disclosure, the device 130 may execute the function determined in operation 703, without receiving a separate input from the user. In another embodiment of the disclosure, the device 130 may display, on the display of the device 130, a user interface associated with the function determined in operation 703. When a user input is received through the displayed user interface, the device 130 may execute the determined function. However, when no user input is received through the displayed user interface, the device 130 may not execute the determined function. As described above, the device 130 may determine a function based on context data indicating the current context of the device 130 and may recommend the determined function to the user through the user interface. The device 130 may execute the recommended function automatically or based on the presence or absence of the user input.

Figure 8:
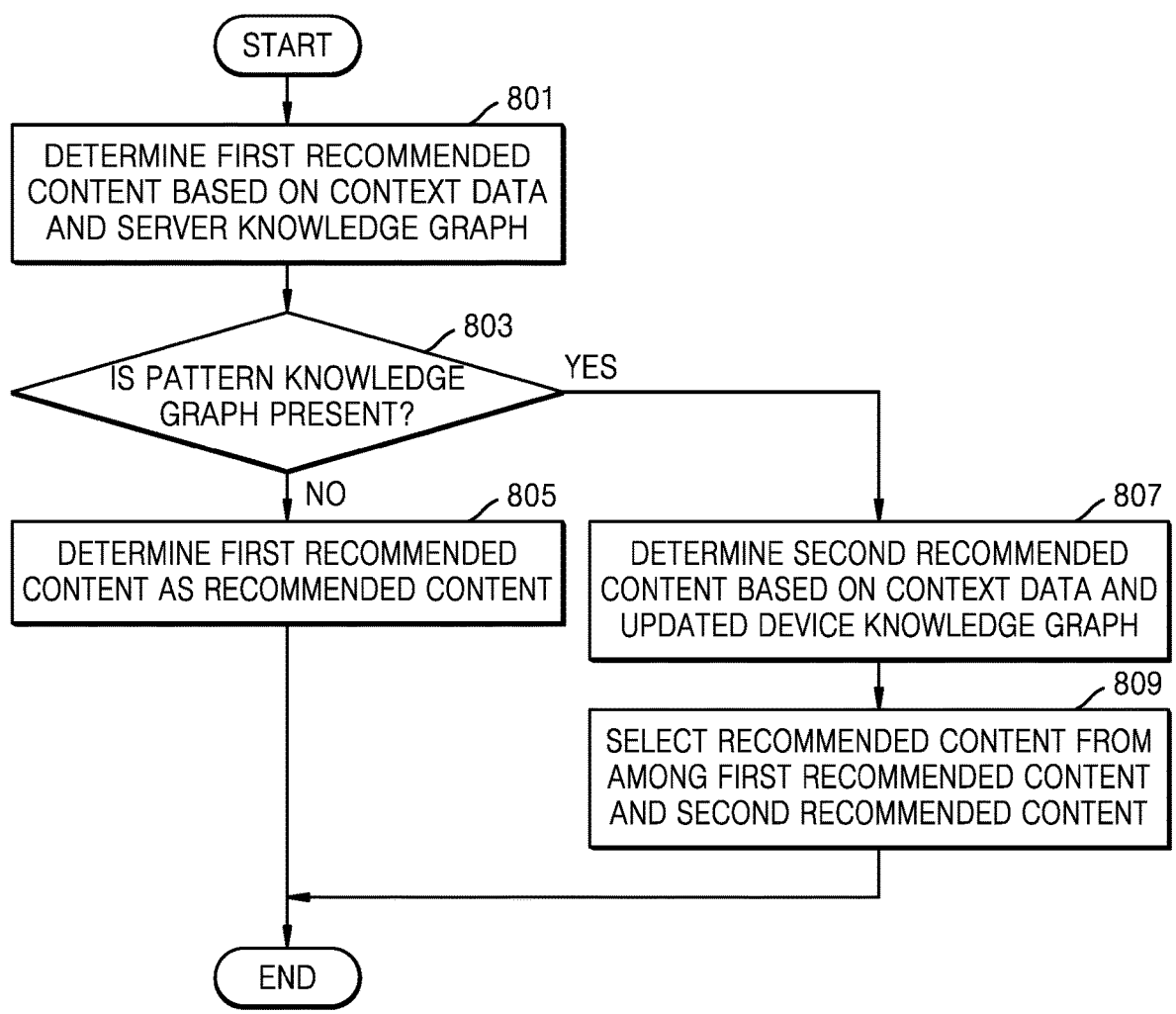
FIG. 8 is a flowchart of a method, performed by a device, of determining recommended content, according to an embodiment of the disclosure.

FIG. 8 is a flowchart of a method, performed by the device 130, of determining recommended content, according to an embodiment of the disclosure. In an embodiment of the disclosure, operations of FIG. 8 may be included in operation 703 of FIG. 7.

Referring to FIG. 8, in operation 801, the device 130 may determine first recommended content based on the context data and the server knowledge graph 120. In an embodiment of the disclosure, the context data may refer to data indicating the current context of the device 130. In an embodiment of the disclosure, the device 130 may determine the first recommended content based on a degree of association between the server knowledge graph 120 and the context data indicating the current context. For example, when the context data indicates a context associated with baseball, the device 130 may identify that an entity indicating baseball and an entity indicating baseball news are associated in the server knowledge graph 120. The device 130 may determine baseball news as the first recommended content.

In operation 803, the device 130 may determine the presence or absence of the pattern knowledge graph. For example, the device 130 may determine whether the pattern knowledge graph generated based on the entities in the device knowledge graph and the relationship between the entities is stored in the device 130. In an embodiment of the disclosure, when the pattern knowledge graph is present, the device 130 may perform operation 807. In an embodiment of the disclosure, when no pattern knowledge graph is present, the device 130 may perform operation 805.

In operation 805, the device 130 may determine the first recommended content as recommended content. That is, when no pattern knowledge graph is present, the device 130 may not be able to update the device knowledge graph based on the pattern knowledge graph. Therefore, the device 130 may determine, as recommended content, the first recommended content determined based on the context data indicating the current context and the server knowledge graph.

In operation 807, the device 130 may determine second recommended content based on the context data and the updated device knowledge graph. That is, when the pattern knowledge graph is present, the device 130 may update the device knowledge graph based on the pattern knowledge graph. The device 130 may determine the second recommended content based on the context data indicating the current context of the device 130 and the updated device knowledge graph.

For example, the device 130 may determine the second recommended content based on a degree of association between the updated device knowledge graph and the context data indicating the current context. In an embodiment of the disclosure, the device 130 may identify entities associated with the context data based on the pattern knowledge graph included in the updated device knowledge graph. For example, when the context data indicates a context associated with baseball, the device 130 may identify that an entity indicating baseball and an entity indicating a video reproduction application are associated with each other in the updated device knowledge graph including the pattern knowledge graph. The device 130 may determine the video reproduction application as recommended content.

In operation 809, the device 130 may select recommended content from among the first recommended content and the second recommended content. In an embodiment of the disclosure, the device 130 may select recommended content based on weights assigned to the first recommended content and the second recommended content. For example, the device 130 may input the first recommendation content and the second recommendation content to a ranking algorithm. Different weights may be assigned to the first recommendation content and the second recommendation content through the ranking algorithm. In this case, content to which a higher weight is assigned, among the contents to which the weights are assigned, may be recommended with a higher rank. In an embodiment of the disclosure, the ranking algorithm may refer to an algorithm that allocates weights to specific inputs input to the algorithm according to a preset criterion.

For example, a weight higher than that of the first recommended content may be assigned to the second recommended content determined based on the pattern knowledge graph reflecting the behavior pattern of the user, among the first recommended content determined based on the server knowledge graph 120 and the second recommended content determined based on the updated device knowledge graph. The device 130 may select, as the final recommendation content, the recommendation content to which a higher weight is assigned. For example, the device 130 may select, as the final recommended content, the second recommended content to which a weight higher than that of the first recommended content is assigned. The device 130 may display, on the display of the device 130, a user interface associated with the final recommended content.

Thus, a technical effect is achieved. A CPU represents, in some embodiments, a knowledge graph as a set in a memory. The set may include, for example, a collection of associations, {association1, association2, association3, . . . }. This is a non-limiting example. The establishment of the knowledge graph is described above. For example, see the non-limiting examples of FIG. 5B (inference of pattern1), FIGS. 6A, 6B, 6C (inference of association based on instance, name or structure), also see the discussion of context above such as sleep status and geographic location (at home, at baseball stadium), which may be determined based on sensor inputs. In some embodiments, when a current condition, based on input data has a match (for example high correlation or for example matching labels) with some elements of some associations of the knowledge graph (also consider the set), an algorithm ranks associations and produces content recommendations. This is a non-limiting example.

FIG. 9 illustrates an example of server knowledge graph-based content recommendation and device knowledge graph-based content recommendation, according to an embodiment of the disclosure.

Referring to FIG. 9, a server knowledge graph-based content recommendation method 910 may refer to a method of recommending content based on the server knowledge graph 120 generated by the server 110. For example, information about "baseball game reservation" may be collected from the email application of the device 130, or information about a "baseball" schedule may be collected from the calendar application of the device 130. In this case, the server 110 may identify the information about the "baseball game reservation" and the information about the "baseball" schedule as a "baseball event."

The identified information may be connected to an entity indicating the "baseball event" in the server knowledge graph 120, and the entity indicating the "baseball event" may be connected to an entity indicating "baseball." Through learning using big data, the entity indicating "baseball" in the server knowledge graph 120 may be connected to an entity indicating "new category." That is, in the server knowledge graph-based content recommendation method 910, when the baseball event is identified, the baseball news may be recommended.

According to an embodiment of the disclosure, a content recommendation method 920 prior to user pattern analysis may refer to a method, performed by the device 130, of recommending content before the behavior pattern of the user is analyzed. That is, the content recommendation method 920 prior to the user pattern analysis may refer to a method of recommending content based on the device knowledge graph 140 before the pattern knowledge graph is updated. For example, the device recommendation knowledge generated based on the log history information of the device 130 and the server recommendation knowledge generated based on the server knowledge graph 120 are connected to generate the device knowledge graph 140. When the baseball event is identified based on the generated device knowledge graph 140, the device 130 may recommend content associated with baseball news.

According to an embodiment of the disclosure, a content recommendation method 930 after user pattern analysis may refer to a method, performed by the device 130, of recommending content after the behavior pattern of the user is analyzed. That is, the content recommendation method 930 after the user pattern analysis may refer to a method of recommending content based on the updated device knowledge graph after the pattern knowledge graph is updated. For example, a pattern knowledge graph 935 associated with the baseball event may be connected to the device knowledge graph 140. When the baseball event is identified, the pattern knowledge graph 935 associated with the baseball event may indicate that a baseball channel is watched and the YouTube application is used when the baseball channel is watched. When the baseball event is identified, the device 130 may recommend a YouTube baseball channel frequently watched by the user among channels of the YouTube application, based on the updated device knowledge graph in which the pattern knowledge graph 935 is updated.

As described above with reference to FIG. 9, when the device knowledge graph 140 is updated based on the pattern knowledge graph 935 reflecting the behavior pattern of the user, the device 130 may recommend user-customized content by using the updated device knowledge graph.

Figure 10A:
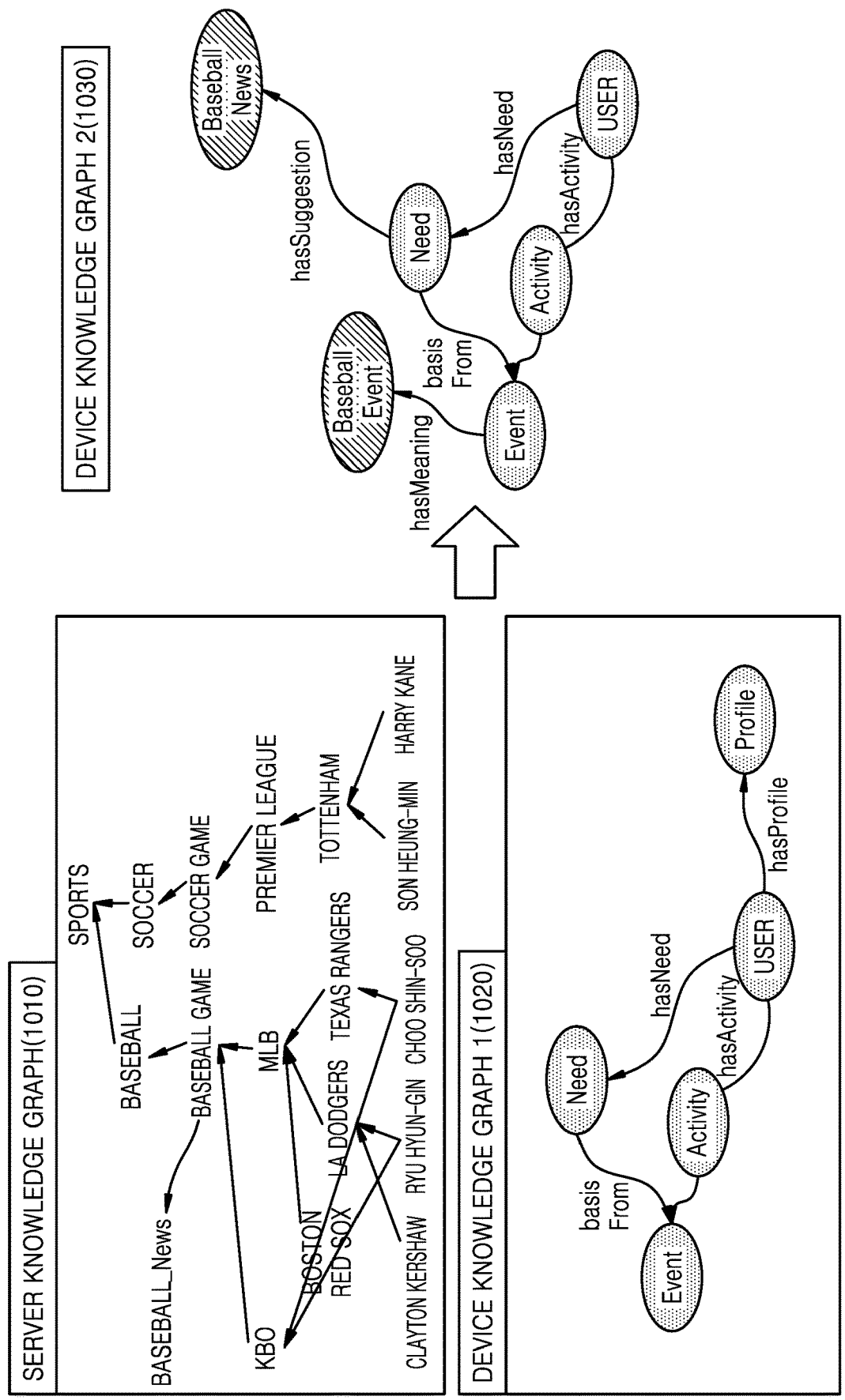
FIG. 10A illustrates an example of a method of generating a device knowledge graph, according to an embodiment of the disclosure.

FIG. 10A illustrates an example of a method of generating a device knowledge graph, according to an embodiment of the disclosure.

Referring to FIG. 10A, a server knowledge graph 1010 associated with a baseball game may be generated in advance by the server 110. For example, the server 110 may identify the baseball game as an event from baseball-related data (e.g., KBO, MLB, Ryu Hyun-jin, Choo Shin-soo, etc.). An entity indicating a baseball game event may be included in the server knowledge graph 1010. The server 110 may recommend baseball news when a baseball game is identified through learning using big data. For example, in the server knowledge graph 1010, the entity indicating the baseball game event and the entity indicating the baseball news may be connected to each other. That is, when the baseball game is identified, the baseball news may be determined as recommended content. The server knowledge graph 1010 of FIG. 10 may refer to the server knowledge graph 120 of FIG. 1.

According to an embodiment of the disclosure, the device 130 may generate device knowledge graph 1 1020. For example, the device 130 may display a relationship of an entity indicating a need, an entity indicating an activity, or an entity indicating a profile with respect to an entity indicating a user. For example, information about the user's need may be updated based on a form such as a "user has a need." Device knowledge graph 1 1020 described above may be predefined and stored in the device 130.

According to an embodiment of the disclosure, the device 130 generates device knowledge graph 2 1030 based on the server knowledge graph 1010, device knowledge graph 1 1020, and current knowledge (e.g., log history information, etc.). In an embodiment of the disclosure, device knowledge graph 2 1030 may refer to the device knowledge graph 140 of FIG. 1.

According to an embodiment of the disclosure, in order to generate the knowledge graph, the device 130 may express data in a refined form by analyzing log history information generated by the device 130, a sensing value accumulated in the database of the device 130 (e.g., real-time step count, etc.), multimedia file information (e.g., photos, videos, etc.), a user's behavior (e.g., search for a specific word in an Internet browser or transmission of a message to a specific person), and the like. However, these pieces of data are in an atypical form and need to be converted into a knowledge graph form so as to derive meaningful user-related knowledge.

For example, when there is log history information indicating that the user of the device 130 watched the baseball game from 20:00 to 21:00 by using the YouTube application, the device 130 may generate a graph indicating that a "user (USER) has watched (hasActivity) the baseball game (Activity). Also, the device 130 may indicate that the activity of the user is an activity associated with a baseball event by connecting a baseball event entity to an event entity connected to an Activity entity. Also, the device 130 may connect a baseball news entity to a need (Need) entity of a user (USER) based on the association between the baseball game entity and the baseball news entity in the server knowledge graph 1010. In this manner, the device 130 may reflect knowledge associated with the recommendation of the baseball news to device knowledge graph 2 1030. That is, the device 130 may update device knowledge graph 1 1020 with device knowledge. graph 2 1030 by using the knowledge of the server knowledge graph 1010, the log history information of the user, and the like, based on the structure of device knowledge graph 1 1020.

Figure 10B:
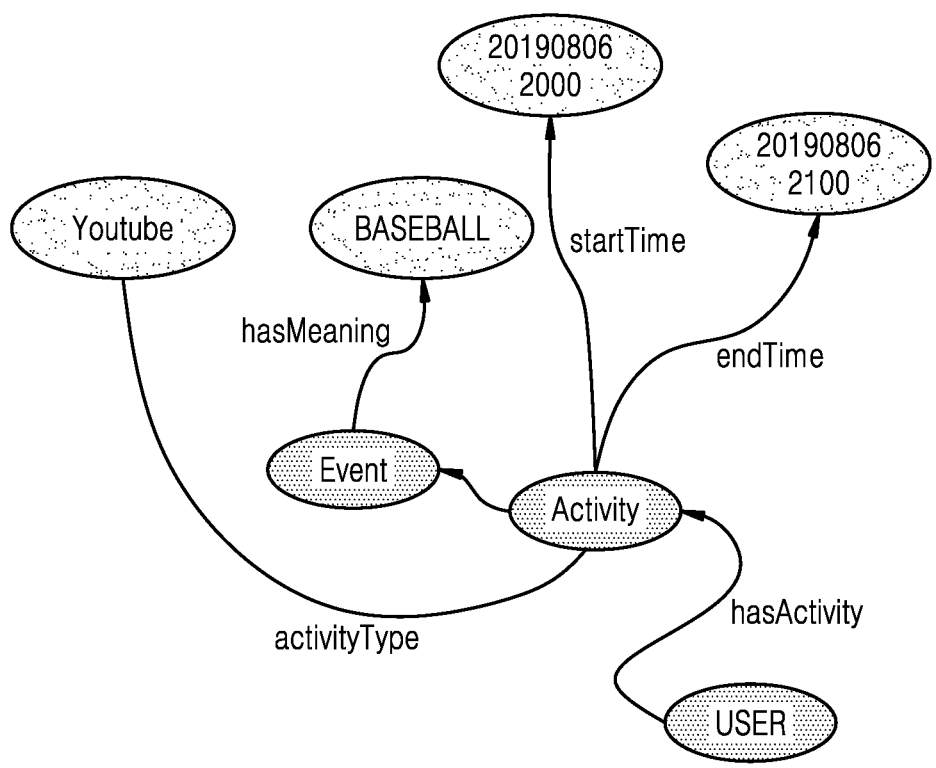
FIG. 10B illustrates an example of a device knowledge graph, according to an embodiment of the disclosure.
Figure 10C:
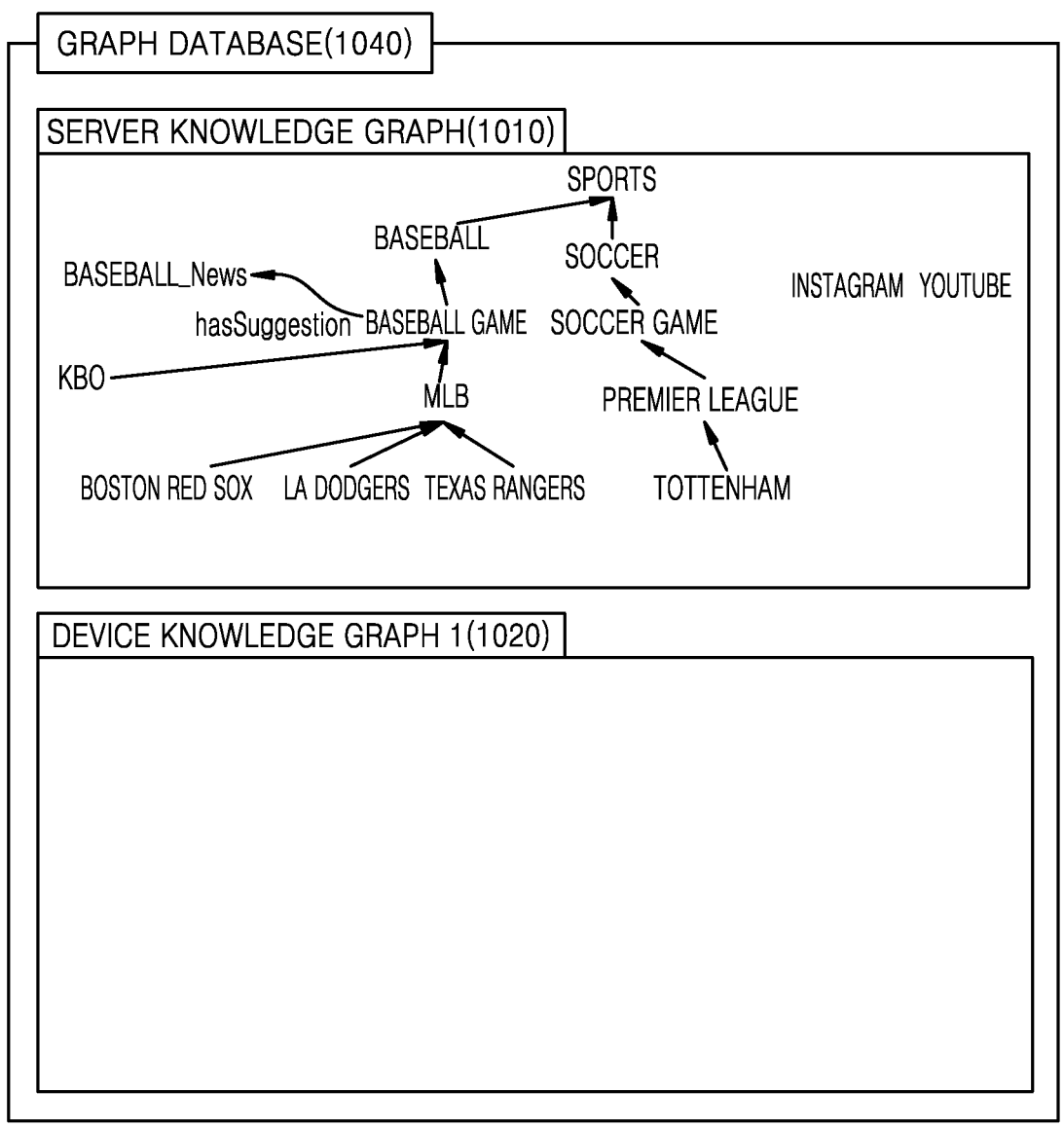
FIG. 10O illustrates an example of a specific procedure of generating a device knowledge graph, according to an embodiment of the disclosure.
FIG. 10D illustrates an example of a specific procedure of generating a device knowledge graph, according to an embodiment of the disclosure.

In an embodiment of the disclosure, another example of device knowledge graph 2 1030 is illustrated in FIG. 10B. Referring to FIG. 10B, as described above, when there is log history information indicating that the user watched the baseball game at a specific time by using the YouTube application, the device 130 may generate a graph indicating that a "user (USER) has watched (hasActivity) the baseball game (Activity). Because the user has watched the YouTube application, the device 130 may connect the YouTube entity to the Activity entity and connect the baseball entity to the Event entity connected to the Activity. However, the ontology schema that models the behavior of the user through the graph may be various and is not limited to the example of FIG. 10B.

As described above, the knowledge graph associated with the user may be generated on the on-device. Even when a lot of log data are not continuously stored, the device 130 may manage user-related knowledge in a form that may be inferred with a small number of resources.

FIG. 100 illustrates a specific procedure of generating the device knowledge graph of FIG. 10A.

Referring to FIG. 100, a graph database 1040 may be included in the device 130. The graph database 1040 may include a server knowledge graph 1010 and a device knowledge graph 1. The server knowledge graph 1010 is a knowledge graph constructed in the server 110 and stored in the device 130 and may refer to a knowledge graph indicating common knowledge or knowledge associated with recommendation. Also, device knowledge graph 1 1020 may refer to a knowledge graph constructed in the device 130.

In an embodiment of the disclosure, when the user of the device 130 does not perform any behavior, device knowledge graph 1 1020 of the device 130 may not be generated. An example in which the device knowledge graph is generated according to the behavior of the user is illustrated in FIG. 10D.

Figure 10D:
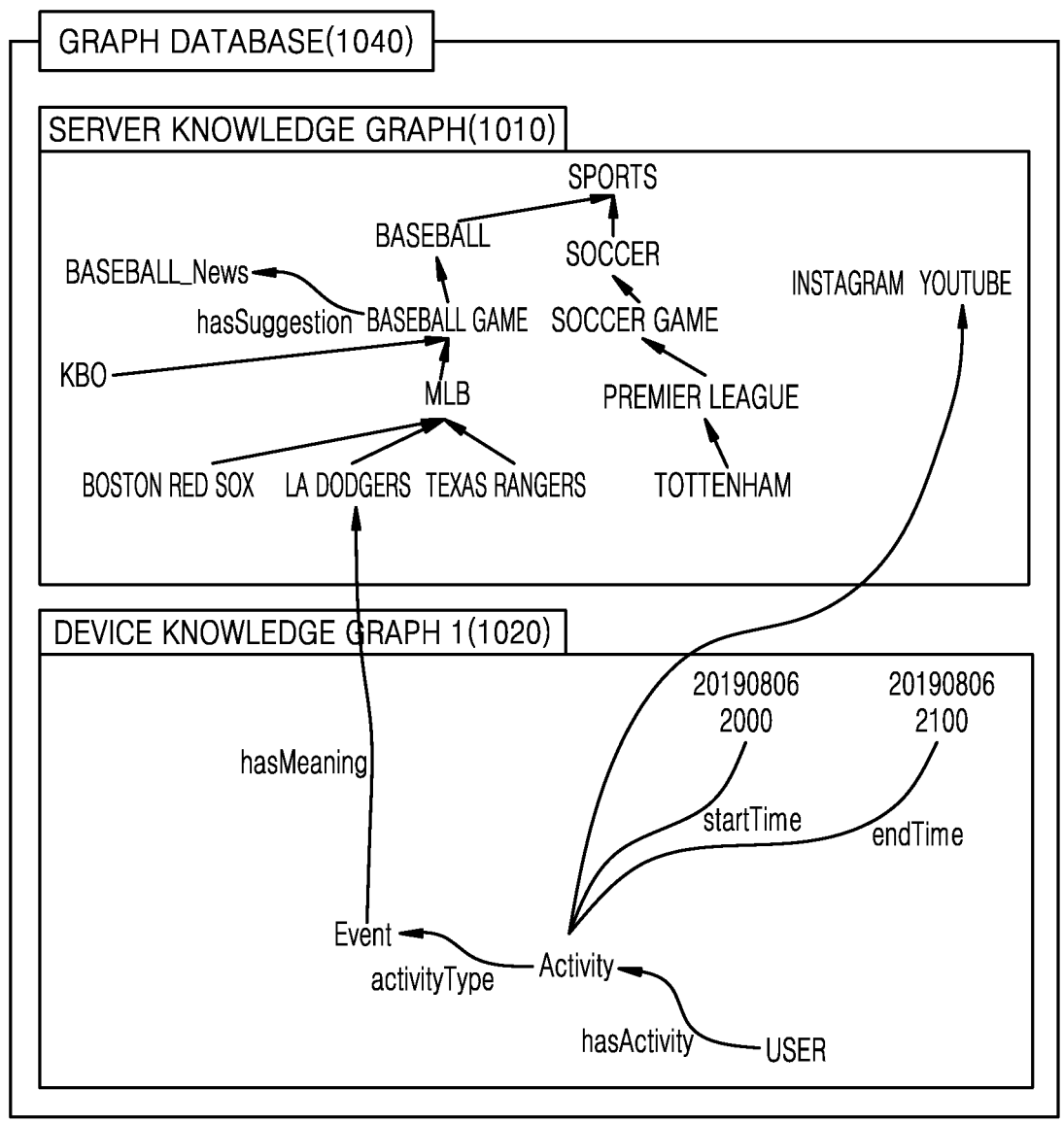

Referring to FIG. 10D, when there is log history information indicating that the user of the device 130 watched an LA Dodgers' game at a specific time (e.g., 20:00 to 21:00) by using a YouTube application, the device 130 may generate device knowledge graph 1 1020. In this manner, the device 130 may confirm connectivity between the device knowledge graph and the server knowledge graph. That is, the Event entity of device knowledge graph 1 1020 may be connected to the "LA Dodgers" entity of the server knowledge graph 1010. The device 130 may recommend baseball news to the user (USER) through a connection relationship from the "LA Dodgers" entity to the "Baseball News" entity. Upon recommendation, the device 130 may use a query based on an ontology schema and inference using a rule. For example, the device 130 may select recommended content by using a query to find an entity that is directly or indirectly connected to the USER entity through a "hasSuggestion" edge.

As described above, the behavior of the user of the device 130 may be learned and documented in the device knowledge graph (e.g., device knowledge graph 1 1020), and the device knowledge graph and the server knowledge graph (e.g., server knowledge graph 1010) may be connected, so that the device 130 recommends the content to the user based on the connected knowledge graph (e.g., device knowledge graph 2 1030). However, the device 130 may recommend the content by analyzing the behavior pattern of the user as described above with respect to the recommendation of the content based on the behavior of the user. Therefore, FIG. 11 illustrates an example of updating the device knowledge graph 140 based on the pattern knowledge graph indicating the behavior pattern of the user.

Figure 11:
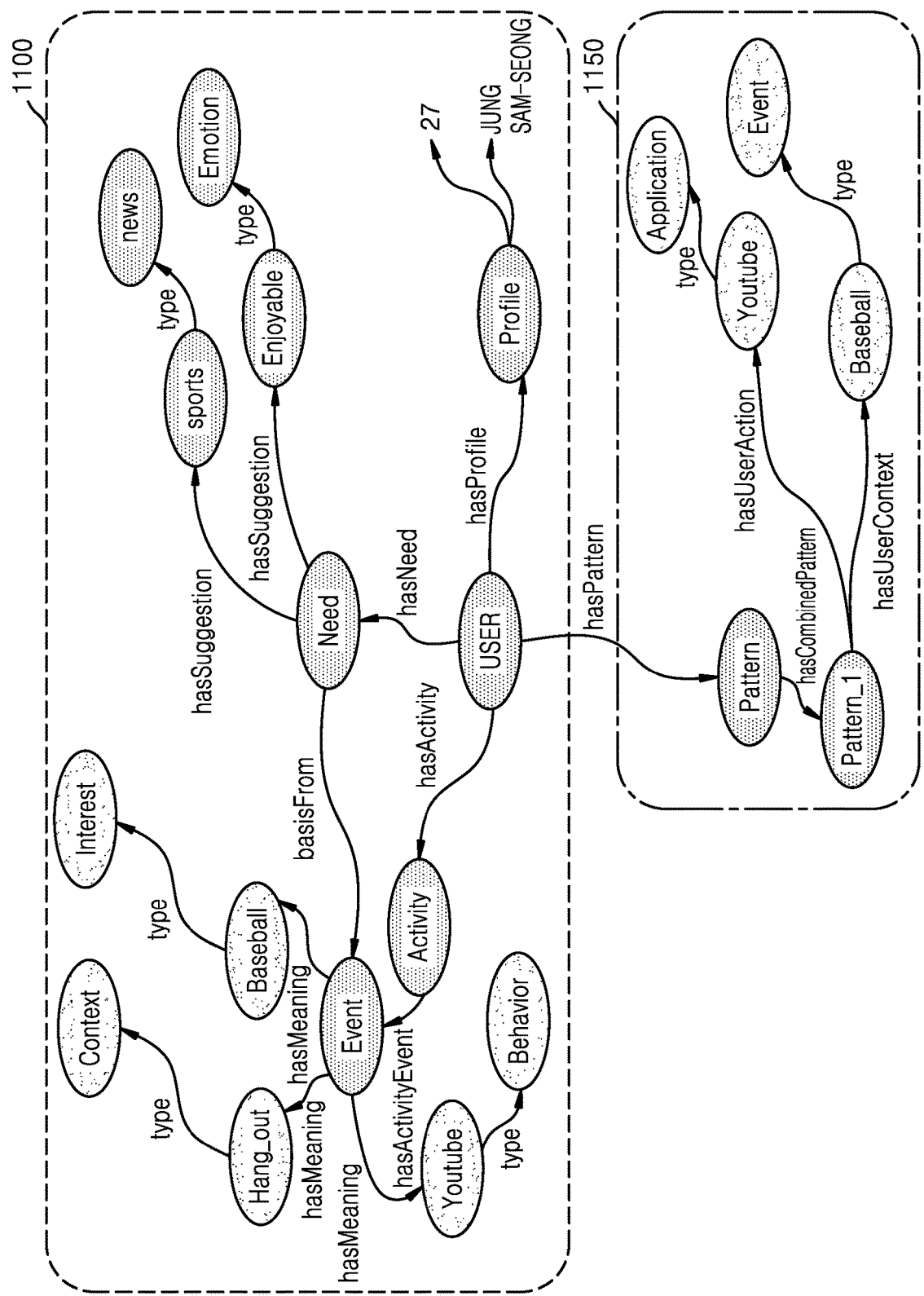
FIG. 11 is an example of a device knowledge graph and a pattern knowledge graph, according to an embodiment of the disclosure.

FIG. 11 is an example of a device knowledge graph and a pattern knowledge graph, according to an embodiment of the disclosure.

Referring to FIG. 11, a device knowledge graph 1100 and a pattern knowledge graph 1150 are illustrated. In this case, the device knowledge graph 1100 of FIG. 11 may refer to the device knowledge graph 140 of FIG. 1. In an embodiment of the disclosure, the device knowledge graph 1100 may include entities generated based on log history information about the operation of the device 130. For example, the device knowledge graph 1100 includes an entity indicating a user, an entity indicating a profile of the user, an entity indicating an activity of the user, an entity indicating an event, an entity indicating a user's need, an entity indicating enjoyable, an entity indicating an emotion, an entity indicating sports, and an entity indicating news.

Also, the device knowledge graph 1100 may include some entities included in the server knowledge graph 120. For example, the device knowledge graph 1100 may include an entity indicating baseball, an entity indicating an interest of the user, an entity indicating hang-out among activities of the user, an entity indicating a context, an entity indicating YouTube, and an entity indicating a behavior of the user.

Referring to the device knowledge graph 1100 of FIG. 11, an entity indicating a specific event among the activities of the user of the device 130 may be connected to the entity indicating baseball, the entity indicating hangout, and the entity indicating YouTube. This may mean that an event associated with the user is an event associated with baseball, an event associated with hangout, or an event associated with YouTube.

According to an embodiment of the disclosure, in the device knowledge graph 1100, the entity indicating baseball may be connected to the entity indicating the interest of the user. This may mean that the entity associated with baseball is classified into a type indicating the interest of the user.

Also, according to an embodiment of the disclosure, in the device knowledge graph 1100, the entity indicating hangout may be connected to the entity indicating the context of the user. This may mean that the entity associated with hang-out is classified into a type indicating the context of the user.

Also, according to an embodiment of the disclosure, in the device knowledge graph 1100, the entity indicating YouTube may be connected to the entity indicating the behavior of the user. This may mean that the entity associated with YouTube is classified into a type indicating the behavior of the user.

In an embodiment of the disclosure, the pattern knowledge graph 1150 may include entities generated based on the behavior pattern of the user. For example, the pattern knowledge graph 1150 may include an entity indicating a pattern, an entity indicating a first pattern (pattern 1), an entity indicating YouTube, an entity indicating baseball, an entity indicating an event, and an entity indicating an application.

For example, the entity indicating YouTube and the entity indicating baseball may be connected to the entity indicating the first pattern. This may mean that the first pattern is a pattern generated in a context associated with baseball. Also, the first pattern may indicate a user's behavior of executing a YouTube application. Also, the entity indicating YouTube may be classified into a type indicating the application, and the entity indicating baseball may be classified into a type indicating the event.

According to an embodiment of the disclosure, the device knowledge graph 1100 may be updated by connecting the pattern knowledge graph 1150 to the entity indicating the user among the entities included in the device knowledge graph 1100. That is, the device knowledge graph 1100 to which the pattern knowledge graph 1150 is connected may refer to the updated device knowledge graph.

According to an embodiment of the disclosure, data used when the device knowledge graph 1100 is generated may include user activity information including user privacy data. The pattern knowledge graph 1150 may include user pattern information that does not include the user privacy data. For example, the user privacy data may include information about a schedule of the user of the device 130, information about a name of the application used, and information about a search history.

As described above with reference to FIG. 11, 11, the device knowledge graph 1100 may be updated based on the pattern knowledge graph 1150 reflecting the behavior pattern of the user. The device 130 may provide the function to the user by using the updated device knowledge graph.

Figure 12:
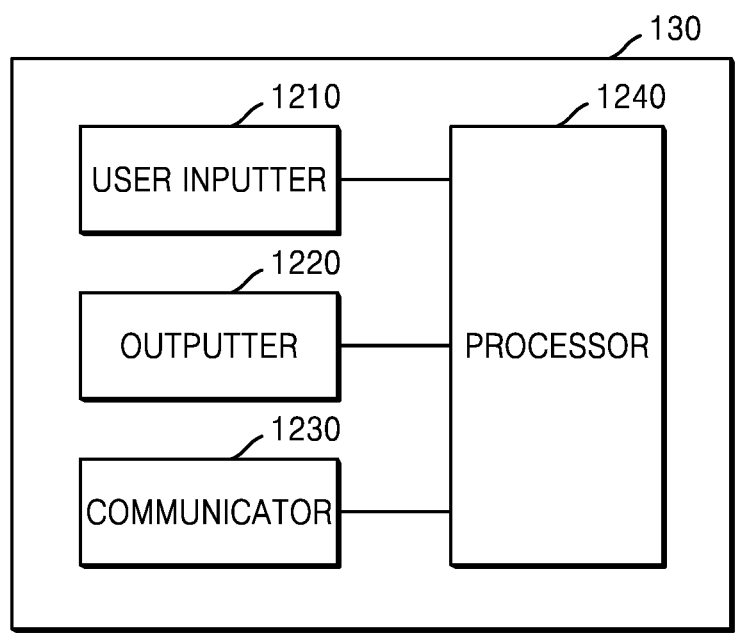
FIG. 12 is a block diagram of a device according to an embodiment of the disclosure.

FIG. 12 is a block diagram of the device 13 according to an embodiment of the disclosure.

Referring to FIG. 12, the device 130 according to the embodiment of the disclosure may include a user inputter 1210, an outputter 1220, a communicator 1230, and a processor 1240. Structures of the device 130 may in general be implemented by one or more processors using one or more memories. The one or more memories may include instructions in the form of computer code for implementation of functions of the structures (eg., inputter 1210, outputter 1220, communicator 1230 and in general other structures of the device). However, all elements illustrated in FIG. 12 are not essential to the device 130. The device 130 may include more elements than those illustrated in FIG. 12 or may include fewer elements than those illustrated in FIG. 12. For example, FIG. 13 is a detailed block diagram of the device 130 according to an embodiment of the disclosure.

As illustrated in FIG. 13, the device 130 according to the embodiment of the disclosure may include, in addition to the user inputter 1210, the outputter 1220, the communicator 1230, and the processor 1240, a sensor 1310, an audio/video (A/V) inputter 1330, and a memory 1350.

The user inputter 1210 is a device that allows a user to input data for controlling the device 130. For example, the user inputter 1210 may include a key pad, a dome switch, a touch pad (a touch-type capacitive touch pad, a pressure-type resistive touch pad, an infrared beam sensing type touch pad, a surface acoustic wave type touch pad, an integral strain gauge type touch pad, a piezo effect type touch pad, etc.), a jog wheel, and a jog switch, but is not limited thereto.

The user inputter 1210 may receive a user input for providing recommended content based on the updated device knowledge graph.

The outputter 1220 may output an audio signal, a video signal, or a vibration signal. The outputter 1220 may include a display 1222, an audio outputter 1224, and a vibration motor 1226.

The display 1222 displays information processed by the device 130. For example, the display may display a user interface for providing recommended content based on the updated device knowledge graph.

When the display 1222 and the touch pad form a layered structure to constitute a touch screen, the display 1222 may also be used as an input device as well as an output device.

The audio outputter 1224 outputs audio data that is received from the communicator 1230 or is stored in the memory 1350. Also, the audio outputter 1224 outputs an audio signal associated with the function performed by the device 130 (e.g., a call signal reception sound, a message reception sound, and a notification sound). The audio outputter 1224 may include a speaker, a buzzer, and the like.

The vibration motor 1226 may output a vibration signal. For example, the vibration motor 1226 may output a vibration signal that corresponds to the output of audio data or video data (e.g., a call signal reception sound, a message reception sound, etc.). Also, the vibration motor 1226 may output a vibration signal when a touch is input to a touch screen.

The processor 1240 controls overall operations of the device 130. That is, the processor 1240 may control one or more other elements of the device 130 by executing programs stored in the memory 1350. For example, the processor 1240 may control the operation of the device 130 by controlling the user inputter 1210, the outputter 1220, the sensor 1310, the communicator 1230, the A/V inputter 1330, and the like.

Specifically, the processor 1240 may obtain log history information about the operation of the device 130. The processor 1240 may receive, from the server 110, the server knowledge graph 120 generated by the server 110. The processor 1240 may generate the device knowledge graph 140 using the server knowledge graph 120 and the log history information. The processor 1240 may generate the pattern knowledge graph associated with the behavior pattern of the user of the device 130 based on the entities in the device knowledge graph 140 and the relationship between the entities. The processor 1240 may update the device knowledge graph 140 by adding the generated pattern knowledge graph to the device knowledge graph 140.

The processor 1240 may generate knowledge data by inputting the log history information to the knowledge graph generation model. The processor 1240 may generate the device knowledge graph 140 by updating at least part of the server knowledge graph 120 based on the relationship between the knowledge data and the entities in the server knowledge graph 120.

The processor 1240 may identify, from the device knowledge graph 140, the entities associated with the behavior of the user and the entities associated with the context of the user. The processor 1240 may generate the pattern knowledge graph associated with the behavior pattern of the user based on the entity associated with the behavior, the entity associated with the context, and the relationship between the entity associated with the behavior and the entity associated with the context.

The processor 1240 may determine an association relationship between the entity associated with the context and the entity associated with the behavior. The processor 1240 may generate the pattern knowledge graph based on the determined association relationship.

The processor 1240 may select at least one entity to which the pattern knowledge graph is to be connected, from among the entities in the device knowledge graph 140. The processor 1240 may connect the pattern knowledge graph to the selected at least one entity.

The processor 1240 may obtain context data indicating the current context of the device 130. The processor 1240 may determine the function to be provided to the user by using the obtained context data and the pattern knowledge graph in the updated device knowledge graph. The processor 1240 may execute the determined function.

The processor 1240 may determine recommended content to be provided to the user. In order to determine the recommended content, the processor 1240 may determine first recommended content based on the context data indicating the current context of the user and the server knowledge graph 120. The processor 1240 may determine second recommended content based on the context data indicating the current context of the user and the updated device knowledge graph 140. The processor 1240 may select at least one of the first recommended content or the second recommended content.

In order to determine the first recommended content, the processor 1240 may determine the first recommended content based on a degree of association between the server knowledge graph 120 and the context data indicating the current context.

In order to determine the second recommended content, the processor 1240 may determine the second recommended content based on a degree of association between the updated device knowledge graph and the context data indicating the current context.

In order to select the recommended content, the processor 1240 may determine, as the recommended content, content having a higher weight among a weight assigned to the first recommended content and a weight assigned to the second recommended content.

The sensor 1310 may detect a state of the device 130 or a state around the device 130 and transmit the detected information to the processor 1240.

The sensor 1310 may include at least one of a geomagnetic sensor 1312, an acceleration sensor 1314, a temperature/humidity sensor 1316, an infrared sensor 1318, a gyroscope sensor 1320, a position sensor (e.g., GPS) 1322, a barometric sensor 1324, a proximity sensor 1326, or an RGB sensor (illuminance sensor) 1328, but is not limited thereto. Because the functions of the respective sensors may be intuitively inferred from their names, detailed descriptions thereof will be omitted.

The communicator 1230 may include one or more elements for communication with the server 110. For example, the communicator 1230 may include a short-range wireless communicator 1232, a mobile communicator 1234, and a broadcasting receiver 1236.

The short-range wireless communicator 1232 may include a Bluetooth communicator, a Bluetooth Low Energy (BLE) communicator, a near field communicator, a wireless local access network (WLAN) (Wi-Fi) communicator, a Zigbee communicator, an infrared data association (IrDA) communicator, a Wi-Fi direct (WFD) communicator, an ultra wideband (UWB) communicator, or an Ant+ communicator, but is not limited thereto.

The mobile communicator 1234 may transmit and receive a wireless signal with at least one of a base station, an external terminal, or a server on a mobile communication network. Examples of the wireless signal may include various formats of data to support transmission and reception of a voice call signal, a video call signal, or a text or multimedia message.

The broadcasting receiver 1236 may receive a broadcast signal and/or broadcast-related information from the outside via a broadcast channel. The broadcast channel may include a satellite channel and a terrestrial channel. The device 130 may not include the broadcasting receiver 1236 according to an implementation example.

The A/V inputter 1330 may receive an audio signal or a video signal and may include a camera 1332, a microphone 1334, and the like. The camera 1332 may obtain an image frame, such as a still image or a moving image, through an image sensor in a video call mode or a photographing mode. An image captured by the image sensor may be processed by the processor 1240 or a separate image processor (not illustrated).

The image frame processed by the camera 1332 may be stored in the memory 1350 or may be transmitted to the outside through the communicator 1230. The camera 1332 may include two or more cameras according to a configuration of a terminal.

The microphone 1334 may receive external audio signals and process the external audio signals into electrical voice data. For example, the microphone 1334 may receive audio signals from an external device or a person. The microphone 1334 may use various noise cancellation algorithms for removing noise generated in the process of receiving external audio signals.

The memory 1350 may store programs for processing and control of the processor 1240 and may store data input to the device 130 or data output from the device 130.

The memory 1350 may include at least one storage medium selected from flash memory, hard disk, multimedia card micro type memory, card type memory (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk.

The memory 1350 may store the updated device knowledge graph in the database by adding the server knowledge graph 120, the device knowledge graph 140, the pattern knowledge graph to which the behavior pattern of the user of the device is reflected, and the pattern knowledge graph. Also, the memory 1350 may store log history information and knowledge data generated from the log history information.

The programs stored in the memory 1350 may be classified into a plurality of modules according to functions thereof. For example, the programs may be classified into a user interface (UI) module 1352, a touch screen module 1354, and a notification module 1356.

The UI module 1352 may provide a specialized UI or graphical user interface (GUI) that interworks with the device 130 according to applications. The touch screen module 1354 may detect a user's touch gesture on a touch screen and transmit information about the touch gesture to the processor 1240. According to an embodiment of the disclosure, the touch screen module 1354 may recognize and analyze a touch code. The touch screen module 1354 may be implemented as separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may sense a contact of a specific object at or beyond a sensitivity of a person. The tactile sensor may detect a variety of information, such as roughness of a contact surface, hardness of a contact object, or a temperature of a contact point.

Also, an example of the sensor that detects the touch on the touch screen may be a proximity sensor.

The proximity sensor refers to a sensor that detects the presence or absence of an object approaching a certain detection surface or an object existing near the sensor by using an electromagnetic force or infrared light, without mechanical contact. The user's touch gesture may include a tap, a touch-and-hold, a double-tap, a drag, a panning, a flick, a drag-and-drop, a swipe, and the like.

The notification module 1356 may output a signal for notifying that an event occurs in the device 130. The notification module 1356 may output a notification signal through the display 1222 in the form of a video signal. The notification module 1356 may output a notification signal through the audio outputter 1224 in the form of an audio signal. The notification module 1356 may output a notification signal through the vibration motor 1226 in the form of a vibration signal.

Figure 14:
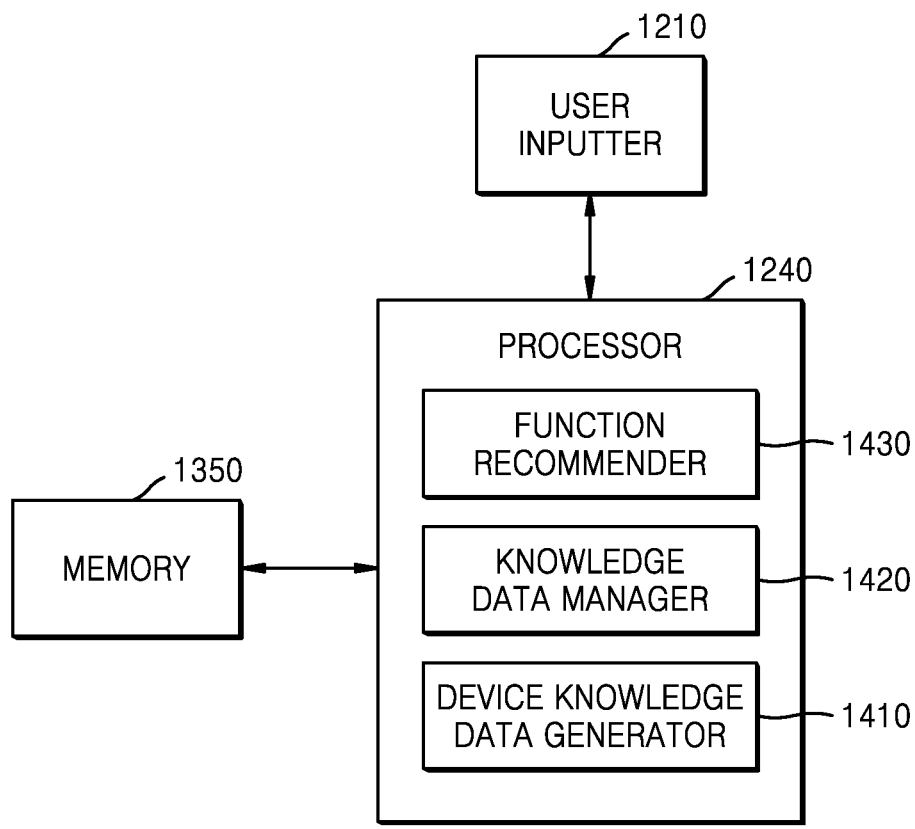
FIG. 14 is a block diagram of a processor of the device, according to an embodiment of the disclosure.

FIG. 14 is a block diagram of the processor 1240 of the device 130, according to an embodiment of the disclosure.

Referring to FIG. 14, the device 130 according to the embodiment of the disclosure may include the user inputter 1210, the processor, and the memory 1350. Also, the processor 1240 may include a device knowledge data generator 1410, a knowledge data manager 1420, and a function recommender 1430. Additionally, structures of the device 130 may in general be implemented by one or more processors using one or more memories. The one or more memories may include instructions in the form of computer code for implementation of functions of the structures (eg., device knowledge data generator 1410, knowledge data manager 1420, and function recommender 1430 and in general other structures of the device). However, all elements illustrated in FIG. 14 are not essential to the device 130. The device 130 may include more elements than those illustrated in FIG. 14 or may include fewer elements than those illustrated in FIG. 14.

Referring to FIG. 14, the user of the device 130 may input a request for a recommended function through the user inputter 1210. In an embodiment of the disclosure, the recommended function may refer to a function to be provided to the user of the device 130 among various functions of the device 130. For example, the user of the device 130 may input a request for the recommended function to the device 130 through a physical device such as a key pad or a touch pad. Also, the user of the device 130 may execute a Bixby application and input a request for the recommended function to the device 130 through voice. The request for the recommended function may be input to the device 130 through various methods, and the disclosure is not limited to the above-described method.

The device knowledge data generator 1410 may obtain log history information about the operation of the device 130. The log history information may be stored in the memory 1350. Alternatively, the log history information may be directly input to the device knowledge data generator 1410 without being stored in the memory 1350. In an embodiment of the disclosure, the device knowledge data generator 1410 may generate knowledge data by inputting the log history information to the knowledge graph generation model. In this case, the knowledge data may refer to data expressed in a text form.

In an embodiment of the disclosure, the device knowledge data generator 1410 may obtain, from the memory 1350, the server knowledge graph 120 generated by the server 110. Also, the device knowledge data generator 1410 may update at least part of the server knowledge graph 120 by combining the server knowledge graph 120 with the knowledge data. In this case, the updated server knowledge graph may refer to the device knowledge graph 140. The device knowledge data generator 1410 may store the device knowledge graph 140 in the memory 1350.

In an embodiment of the disclosure, the device knowledge data generator 1410 may store, in the memory 1350, the knowledge data generated based on the log history information. In an embodiment of the disclosure, the device knowledge data generator 1410 may store the device knowledge graph 140 in the memory 1350 in the text form like the knowledge data. In this case, the knowledge data of the text form may be converted into a knowledge graph form and stored in the memory 1350.

According to an embodiment of the disclosure, the knowledge data manager 1420 may obtain, from the device knowledge graph 140 stored in the memory 1350, an entity associated with the context of the user of the device 130 and an entity associated with the behavior of the user. The pattern knowledge graph may be generated based on the entity associated with the context, the entity associated with the behavior, and the relationship between the entity associated with the context and the entity associated with the behavior. Alternatively, the knowledge data manager 1420 may generate the pattern knowledge data of the text form.

According to an embodiment of the disclosure, the knowledge data manager 1420 may update the device knowledge graph 140 by adding the pattern knowledge graph to the device knowledge graph 140. The knowledge data manager 1420 may store the updated device knowledge graph in the memory 1350.

According to an embodiment of the disclosure, the function recommender 1430 may obtain context data indicating the current context of the device 130. The function recommender 1430 may determine the function to be provided to the user by using the context data and the pattern knowledge graph included in the device knowledge graph. The function recommender 1430 may transmit information about the determined function to the user inputter 1210. For example, the function recommender 1430 may transmit, to the user inputter 1210, information about recommended content to be provided to the user.

In an embodiment of the disclosure, the information about the determined function transmitted to the user inputter 1210 may be displayed on the outputter 1220. For example, the information about the determined function may be visually displayed on the display 1222 of the device 130, may be transmitted as sound through the audio outputter 1224, or may be transmitted as vibration through the vibration motor 1226. However, the information about the determined function may be transmitted to the user in various forms, and the disclosure is not limited to the above-described example.

Figure 15:
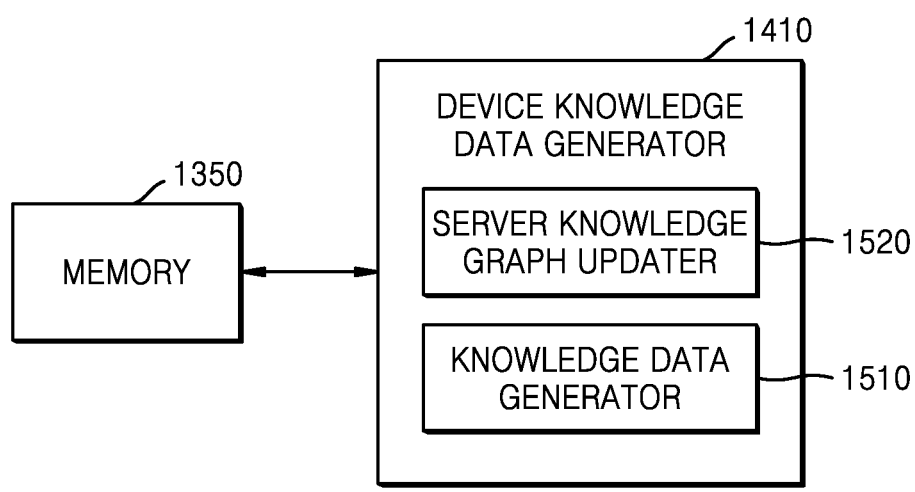
FIG. 15 is a block diagram of a device knowledge data generator of the device, according to an embodiment of the disclosure.

FIG. 15 is a block diagram of the device knowledge data generator 1410 of the device 130, according to an embodiment of the disclosure.

In FIG. 15, the device knowledge data generator 1410 according to the embodiment of the disclosure may include a knowledge data generator 1510 and a server knowledge graph updater 1520. However, all elements of the device knowledge data generator 1410 illustrated in FIG. 15 are not essential to the device knowledge data generator 1410. The device knowledge data generator 1410 may include more elements than those illustrated in FIG. 15 or may include fewer elements than those illustrated in FIG. 15.

Referring to FIG. 15, the knowledge data generator 1510 may obtain log history information about the operation of the device 130. For example, the device 130 may generate knowledge data from log history information associated with a schedule stored in a calendar application in the device 130 (e.g., calendar, "baseball game," 20190705:17:00, 20190705:21:00) or log history information associated with a search history of a YouTube application in the device 130 (App, YoutubeApp, "Baseball Highlights," 20190705:20:50 or App, YoutubeApp, "I Love Baseball," 20190705:21:18).

According to an embodiment of the disclosure, the knowledge data generator 1510 may generate knowledge data by inputting the log history information to the knowledge graph generation model. For example, the knowledge data may include data such as {User, hasActivity, CalendarActivity}, {CalendarActivity, hasTitle, "baseball game"}, {CalendarActivity, hasStartTime, 2019}, {User, hasActivity, AppUsage1}, {AppUsage1, hasApp, Youtube}, and {AppUsage1, hasVideoTitle, "Baseball Highlight"}. In this case, {User, hasActivity, CalendarActivity} may mean that the user has an activity described in the calendar application. Also, {CalendarActivity, hasTitle, "baseball game"} may mean that the name of the activity described in the calendar application is "baseball game."

According to an embodiment of the disclosure, the server knowledge graph updater 1520 may generate the device knowledge graph 140 by updating at least part of the server knowledge graph 120 based on the relationship between the entities in the server knowledge graph 120 and the knowledge data. For example, the server knowledge graph updater 1520 may connect knowledge data to the entities of the server knowledge graph 120. For example, the server knowledge graph updater 1520 may connect the knowledge data, such as {CalendarActivity, hasMeaning, Baseball_Event} and {AppUsage1, hasMeaning, Youtube_Baseball}, to the entities of the server knowledge graph 120. In this case, {Baseball_Event} and {Youtube_Baseball} may mean that the entities of the server knowledge graph 120 are expressed as text. For example, {CalendarActivity, hasMeaning, Baseball_Event} may mean that the activity described in the calendar application is a baseball game event. Also, {AppUsage1, hasMeaning, Youtube_Baseball} may mean that an application used by a user is a YouTube application associated with baseball.

According to an embodiment of the disclosure, the server knowledge graph updated based on the knowledge data may refer to the device knowledge graph 140. The server knowledge graph updater 1520 may store the generated device knowledge graph 140 in the memory 1350.

Figure 16:
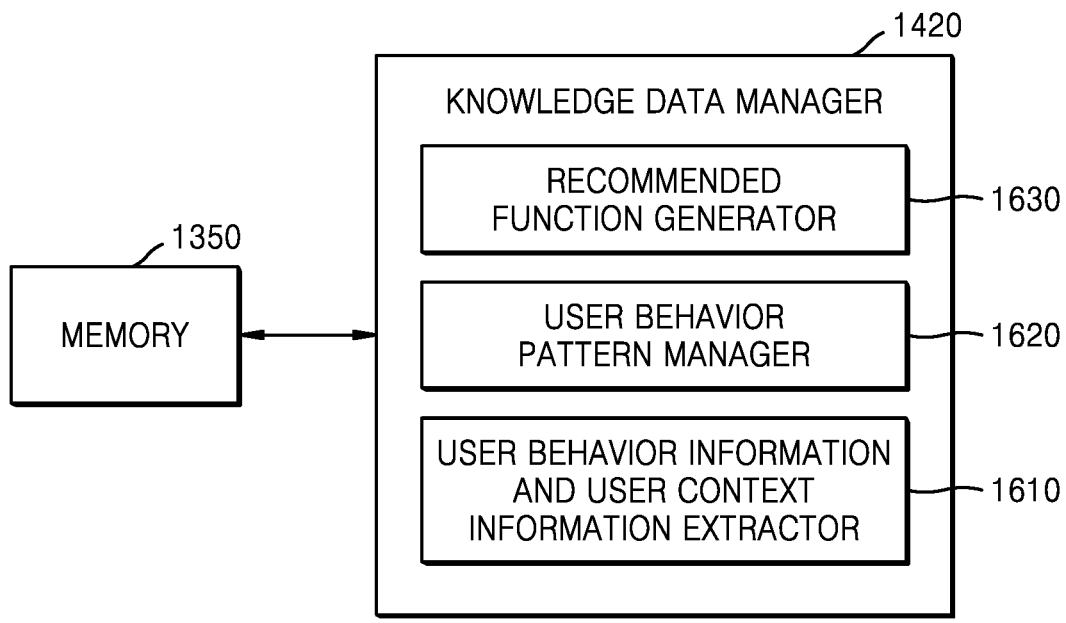
FIG. 16 is a block diagram of a knowledge data manager of the device, according to an embodiment of the disclosure.

FIG. 16 is a block diagram of the knowledge data manager 1420 of the device 130, according to an embodiment of the disclosure.

Referring to FIG. 16, the knowledge data manager 1420 according to the embodiment of the disclosure may include a user behavior information and user context information extractor 1610, a user behavior pattern manager 1620, and a recommended function generator 1630. However, all elements of the knowledge data manager 1420 illustrated in FIG. 16 are not essential to the knowledge data manager 1420. The knowledge data manager 1420 may include more elements than those illustrated in FIG. 16 or may include fewer elements than those illustrated in FIG. 16.

Referring to FIG. 16, the user behavior information and user context information extractor 1610 may obtain behavior information of the user of the device 130 and context information of the user from the device knowledge graph 140 stored in the memory 1350. For example, the behavior information of the user may refer to information about the behavior of the user, such as the user's application usage, URL access, and video reproduction on the device 130. Also, the context information of the user may refer to information about the context in which the user of the device 130 is placed in the past, present, or future, such as the schedule described in the calendar application of the device 130.

In an embodiment of the disclosure, the behavior information of the user and the context information of the user may be extracted from the device knowledge graph 140 and stored in the memory 1350. When the behavior information of the user and the context information of the user are previously stored in the memory 1350, the user behavior information and user context information extractor 1610 may request the stored behavior information of the user and the stored context information of the user by transmitting a query message to the memory 1350. In response to the requested query message, the memory 1350 may transmit the stored behavior information of the user and the stored context information of the user to the user behavior information and user context information extractor 1610. The user behavior information and user context information extractor 1610 may transmit the received behavior information of the user and the received context information of the user to the user behavior pattern manager 1620.

According to an embodiment of the disclosure, the user behavior pattern manager 1620 may generate the pattern knowledge graph based on the received behavior information of the user, the received context information of the user, and the relationship between the behavior information of the user and the context information of the user. That is, the user behavior pattern manager 1620 may generate the pattern knowledge graph based on the entity associated with the behavior, the entity associated with the context, and the relationship between the entity associated with the behavior and the entity associated with the context. For example, the user behavior pattern manager 1620 may generate the knowledge data associated with the pattern, such as {User, hasPattern, Pattern1}, {Pattern1, hasUserContext, Baseball_Event}, and {Pattern1, hasUserAction, Youtube_Baseball}.

For example, {User, hasPattern, Pattern1} may indicate that the user of the device 130 has the behavior pattern of pattern 1. Also, {Pattern1, hasUserContext, Baseball_Event} may indicate that pattern 1 is a pattern generated when the user is placed in a context associated with a baseball game event. {Pattern1, hasUserAction, Youtube_Baseball} may indicate that the behavior of the user indicated by pattern 1 is to execute a YouTube application associated with baseball.

According to an embodiment of the disclosure, the user behavior pattern manager 1620 may determine a criterion such as time, day, place, and user activity type associated with the behavior of the user so as to generate the pattern. The user behavior pattern manager 1620 may count the behavior of the user of the device 130 based on the determined criterion.

When a value obtained by counting the behavior of the user in a specific context exceeds a certain threshold, the user behavior pattern manager 1620 may determine the corresponding behavior as the pattern. For example, when the user of the device 130 executes a YouTube application in a context of going to see a baseball game, the user behavior pattern manager 1620 may count the number of times the user executes the YouTube application when going to see the baseball game. When the counted number of times exceeds a certain threshold, the user's behavior of executing the YouTube application when going to see the baseball game may be determined as the pattern. In an embodiment of the disclosure, the pattern may be determined according to a probability, dispersion degree, etc. of the behavior of the user in the specific context.

The user behavior pattern manager 1620 may update the device knowledge graph 140 by generating the pattern knowledge graph based on the knowledge data associated with the above-described pattern and adding the pattern knowledge graph to the device knowledge graph 140. In an embodiment of the disclosure, the user behavior pattern manager 1620 may store the pattern knowledge graph or the updated device knowledge graph in the memory 1350.

According to an embodiment of the disclosure, the user behavior pattern manager 1620 may transmit information about all or some entities of the generated pattern knowledge graph to the recommended function generator 1630. For example, the user behavior pattern manager 1620 may prioritize the patterns included in the pattern knowledge graph according to a preset criterion and may transmit, to the recommended function generator 1630, only the patterns having a higher priority than the preset criteria.

According to an embodiment of the disclosure, the recommended function generator 1630 may determine a function to recommend to the user of the device 130 based on the received patterns. For example, the recommended function generator 1630 may obtain context data indicating the current context of the device 130 and determine the recommended function based on a degree of association between patterns included in the pattern knowledge graph and context data. The recommended function generator 1630 may transmit the determined function to the function recommender 1430. The function recommender 1430 may select a function to be provided to the device 130, from among the recommended function (e.g., first recommended content) based on the server knowledge graph 120 and the recommended function (e.g., second recommended content) received from the recommended function generator 1630.

Figure 17:
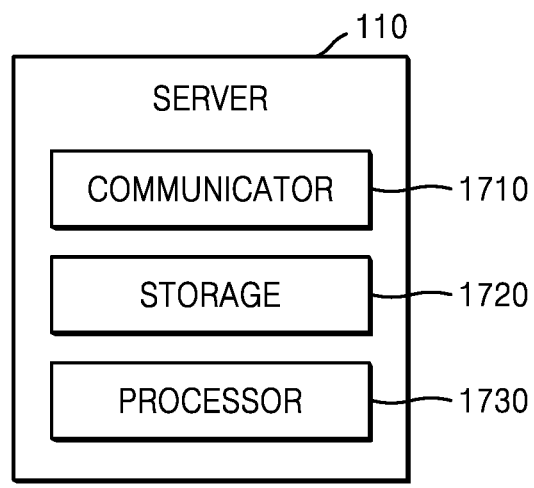
FIG. 17 is a block diagram of a server according to an embodiment of the disclosure.

FIG. 17 is a block diagram of the server 110 according to an embodiment of the disclosure.

Referring to FIG. 17, the server 110 according to the embodiment of the disclosure may include a communicator 1710, a storage 1720, and a processor 1730. Additionally, structures of the server 110 may in general be implemented by one or more processors using one or more memories. The one or more memories may include instructions in the form of computer code for implementation of functions of the structures (eg., communicator 1710 and storage 1720 and in general other structures of the server 110). However, all elements illustrated in FIG. 17 are not essential to the server 110. The server 110 may include more elements than those illustrated in FIG. 17 or may include fewer elements than those illustrated in FIG. 17.

The communicator 1710 may include one or more elements for communication with the device 130. For example, the communicator 1710 may include a short-range wireless communicator, a mobile communicator, and a broadcasting receiver. Also, the communicator 1710 may transmit the server knowledge graph 120 to the device 130.

The storage 1720 may store programs for processing and control of the processor 1730 and may store data input to the server 110 or data output from the server 110. Also, the storage 1720 may store the server knowledge graph 120. The storage 1720 may store the server knowledge graph 120 in the database for each category. For example, the storage 1720 may store a first server knowledge graph 122 and a second server knowledge graph 124 updated in the first server knowledge graph 122.

The processor 1730 may control overall operations of the server 110. That is, the processor 1730 may control one or more other elements of the server 110 by executing programs stored in the storage 1720. For example, the processor 1730 may control overall operations of the communicator 1710 and the storage 1720 by executing the programs stored in the storage 1720. The processor 1730 may control overall operations of the server 110 by controlling the communicator 1710 and the storage 1720.

Artificial intelligence (AI)-related functions according to an embodiment of the disclosure are operated through a processor and a memory. The processor may include one or more processors. The one or more processors may be a general-purpose processor such as a CPU, an access point (AP), or a digital signal processor (DSP), a dedicated graphic processor such as a GPU or a vision processing unit (VPU), or a dedicated AI processor such as a neural processing unit (NPU). The one or more processors perform a control so as to process input data according to predefined operation rules or AI models stored in the memory. Alternatively, when the one or more processors are the dedicated AI processors, the dedicated AI processors may be designed with a hardware structure specialized for processing a specific AI model.

The predefined operation rules or AI models are made through learning. Being made through learning may mean that the basic AI model is trained by using a plurality of pieces of training data by a learning algorithm, such that predefined operation rules or AI models set to perform desired features (or purposes) are made. Such learning may be performed by a device itself on which AI according to an embodiment of the disclosure is performed, or may be performed through a separate server and/or a system. Examples of the learning algorithm may include supervised learning, unsupervised learning, semi-supervised learning, or reinforcement learning, but the disclosure is not limited to the above-described examples.

The methods according to the embodiments of the disclosure, which are described in the claims or the specification of the disclosure, may be implemented as hardware, software, or a combination of hardware and software.

When implemented as software, a computer-readable storage medium or computer program products for storing one or more programs (software modules) may be provided. The one or more programs stored in the computer-readable storage medium or the computer program products are configured to be executable by one or more processors in an electronic device. The one or more programs include instructions that cause the electronic device to execute the methods according to the embodiments of the disclosure, which are described in the claims or the specification of the disclosure.

The one or more programs (software modules, software, etc.) may be stored in RAM, non-volatile memory including flash memory, ROM, EEPROM, magnetic disc storage device, compact disk-ROM (CD-ROM), digital versatile discs (DVDs), other types of optical storage devices, or magnetic cassette. Alternatively, the one or more programs may be stored in a memory provided by a combination of all or part of these devices. Also, each memory may include a plurality of configured memories.

Also, the one or more programs may be stored in an attachable storage device that is accessible through a communication network such as Internet, intranet, local area network (LAN), wide LAN (WLAN), or storage area network (SAN), or a communication network provided by a combination thereof. These storage devices may be connected through an external port to the device that performs the embodiments of the disclosure. Also, a separate storage device on the communication network may access the device that performs the embodiment of the disclosure.

The term "computer program product" or "computer-readable medium" as used herein is used to refer to a medium such as memory, hard disk installed in hard disk drive, and signals. These "computer program products" or "computer-readable media" are devices for providing a method of generating the device knowledge graph 140 by using the server knowledge graph 120 and the log history information according to the embodiment of the disclosure, generating the pattern knowledge graph associated with the behavior pattern of the user of the device 130 based on the entities in the device knowledge graph 140 and the relationships between the entities, and updating the device knowledge graph 140 by adding the generated pattern knowledge graph to the device knowledge graph 140.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

The embodiments of the disclosure, which are described in the specification and drawings, are merely presented as specific examples so as to easily explain the technical contents of the disclosure and help the understanding of the disclosure and are not intended to limit the scope of the disclosure. Therefore, the scope of the disclosure should not be limited to the above-described embodiments of the disclosure and should be determined by the appended claims and the equivalents thereof.

What is claimed is:

1. A method of a device for generating a knowledge graph, the method comprising:
- obtaining, by the device, log history information about an operation of the device;
- generating, by the device, a device knowledge graph based on the log history information, wherein the device knowledge graph is in an ontology form comprising a first entity expressed in a resource description framework (RDF);
- generating, by the device, a pattern knowledge graph associated with a behavior pattern of a user of the device based on first entities in the device knowledge graph and a relationship between the first entities;
- updating, by the device, the device knowledge graph by adding the pattern knowledge graph to the device knowledge graph, wherein device recommendation knowledge generated based on the log history information of the device is connected to server recommendation knowledge generated based on a server knowledge graph of a server to update the device knowledge graph, whereby a content recommendation is formulated at the device based on both the server recommendation knowledge and the device recommendation knowledge, wherein the knowledge graph of the server is in the ontology form expressing a second entity, the knowledge graph of the server is updated periodically by the server based on big data collected through web crawling, the server supports a search engine and the knowledge graph of the server supports the search engine;

updating, by the device, the server knowledge graph generated by the server, based on the pattern knowledge graph by connecting the device recommendation knowledge in the form of the first entity to server recommendation knowledge in the form of the second entity learned through big data, and providing to the user of the device the content recommendation on a user interface of the device, wherein the content recommendation is based on the updated device knowledge graph, whereby the device is configured to recommend user-customized content to the user by using the updated device knowledge graph, wherein the log history information includes data indicating the operation of the device, and the data indicating the operation of the device is collected in the device as the user uses the device;

the method further comprising:
obtaining context data indicating a current context of the device;
determining a function to be provided to the user by using the obtained context data and the pattern knowledge graph in the updated device knowledge graph; and
executing the determined function, wherein the executing the determined function includes providing the content recommendation to the user based on the updated device knowledge graph, wherein the determining of the function comprises determining the content recommendation to be provided to the user, and the determining of the content recommendation comprises:
determining a first recommended content based on the obtained context data indicating the current context of the user and the server knowledge graph;
confirming a presence or absence of the pattern knowledge graph; and
selecting a recommended content based on a result of the confirming.

2. The method of claim 1, wherein the generating of the device knowledge graph comprises:
generating knowledge data by inputting the log history information to a knowledge graph generation model; and
generating the device knowledge graph by connecting at least one of second entities in the server knowledge graph to the knowledge data based on a relationship between the second entities in the server knowledge graph and the knowledge data.

3. The method of claim 1, wherein the generating of the pattern knowledge graph comprises:
identifying, from the device knowledge graph, an entity associated with a behavior of the user and an entity associated with a context of the user; and
generating the pattern knowledge graph associated with the behavior pattern of the user based on the entity associated with the behavior and the entity associated with the context, wherein, when the user of the device performs a specific behavior by using the device in a specific context, the entity associated with the specific behavior is connected to the entity associated with the specific context.

4. The method of claim 3, wherein the generating of the pattern knowledge graph further comprises:
determining an association relationship between the entity associated with the context and the entity associated with the behavior; and
wherein the generating the pattern knowledge graph comprises generating the pattern knowledge graph based on both: i) the entity associated with the behavior and the entity associated with the context and ii) the determined association relationship.

5. The method of claim 1, wherein the updating of the device knowledge graph comprises:
selecting at least one entity to which the pattern knowledge graph is to be connected, from among the first entities in the device knowledge graph; and
connecting the pattern knowledge graph to the selected at least one entity.

6. The method of claim 1, wherein the updating of the server knowledge graph comprises:
selecting at least one entity to which the pattern knowledge graph is to be connected, from among the second entities in the server knowledge graph; and
connecting the pattern knowledge graph to the selected at least one entity.

7. The method of claim 1, wherein the determining of the content recommendation comprises:
when it is confirmed that the pattern knowledge graph is present,
determining a second recommended content based on the obtained context data indicating the current context of the user and the updated device knowledge graph, and
selecting at least one of the first recommended content or the second recommended content; and
when it is confirmed that the pattern knowledge graph is not present,
selecting the first recommended content as the content recommendation.

8. The method of claim 7, wherein the determining of the first recommended content comprises determining the first recommended content based on a degree of association between the server knowledge graph and the obtained context data indicating the current context, and
the determining of the second recommended content comprises determining the second recommended content based on the degree of association between the updated device knowledge graph and the obtained context data indicating the current context.

9. A device for providing content based on a knowledge graph, the device comprising:
a communication interface;
a memory storing one or more instructions; and
a processor configured to execute the one or more instructions to:
obtain log history information about an operation of the device,
generate a device knowledge graph based on the log history information, wherein the device knowledge graph is in an ontology form comprising a first entity expressed in a resource description framework (RDF),
generate a pattern knowledge graph associated with a behavior pattern of a user of the device based on first entities in the device knowledge graph and a relationship between the first entities, update the device knowledge graph by adding the pattern knowledge graph to the device knowledge graph, wherein device recommendation knowledge generated based on the log history information of the device is connected to server recommendation knowledge generated based on a server knowledge graph of a server to update the device knowledge graph, whereby a content recommendation is formulated at the device based on both the server recommendation knowledge and the device recommendation knowledge, wherein the knowledge graph of the server is in the ontology form expressing a second entity, the knowledge graph of the server is updated periodically by the server based on big data collected through web crawling, the server supports a search engine and the knowledge graph of the server supports the search engine, update the server knowledge graph generated by the server, based on the pattern knowledge graph by connecting the device recommendation knowledge in the form of the first entity to server recommendation knowledge in the form of the second entity learned through big data, and provide to the user of the device the content recommendation on a user interface of the device, wherein the content recommendation is based on the updated device knowledge graph, whereby the device is configured to recommend user-customized content to the user by using the updated device knowledge graph, wherein the log history information includes data indicating the operation of the device, and the processor is further configured to execute the one or more instructions to collect the data indicating the operation of the device in the device as the user uses the device, wherein the processor is further configured to execute the one or more instructions to:

obtain context data indicating a current context of the device, determine a function to be provided to the user by using the obtained context data and the pattern knowledge graph in the updated device knowledge graph, execute the determined function, wherein the processor is further configured to execute the determined function by providing the content recommendation to the user based on the updated device knowledge graph, determine a first recommended content based on the obtained context data indicating the current context of the user and the server knowledge graph, confirm a presence or absence of the pattern knowledge graph, and select a recommended content based on a result of the confirming.

10. The device of claim 9, wherein the processor is further configured to execute the one or more instructions to:

generate knowledge data by inputting the log history information to a knowledge graph generation model, and generate the device knowledge graph by connecting at least one of second entities in the server knowledge graph to the knowledge data based on a relationship between the second entities in the server knowledge graph and the knowledge data.

11. The device of claim 9, wherein the processor is further configured to execute the one or more instructions to:

identify, from the device knowledge graph, an entity associated with a behavior of the user and an entity associated with a context of the user, and generate the pattern knowledge graph associated with the behavior pattern of the user based on the entity associated with the behavior and the entity associated with the context, wherein, when the user of the device performs a specific behavior by using the device in a specific context, the processor is further configured to execute the one or more instructions to connect the entity associated with the specific behavior to the entity associated with the specific context.

12. The device of claim 11, wherein the processor is further configured to execute the one or more instructions to:

determine an association relationship between the entity associated with the context and the entity associated with the behavior, and generate the pattern knowledge graph based on both: i) the entity associated with the behavior and the entity associated with the context and ii) the determined association relationship.

13. The device of claim 9, wherein the processor is further configured to execute the one or more instructions to:

select at least one entity to which the pattern knowledge graph is to be connected, from among the first entities in the device knowledge graph, and connect the pattern knowledge graph to the selected at least one entity.

14. The device of claim 9, wherein the processor is further configured to execute the one or more instructions to:

select at least one entity to which the pattern knowledge graph is to be connected, from among the second entities in the server knowledge graph, and connect the pattern knowledge graph to the selected at least one entity.

15. The device of claim 9, wherein the processor is further configured to execute the one or more instructions to:

when it is confirmed that the pattern knowledge graph is present, determine a second recommended content based on the obtained context data indicating the current context of the user and the updated device knowledge graph, and select at least one of the first recommended content or the second recommended content, and when it is confirmed that the pattern knowledge graph is not present, select the first recommended content as the content recommendation.

16. The device of claim 15, wherein the processor is further configured to execute the one or more instructions to:

determine the first recommended content based on a degree of association between the updated device knowledge graph and the obtained context data indicating the current context, and determine the second recommended content based on the degree of association between the updated device knowledge graph and the context data indicating the current context.

* * * * *